US012630358B2

(12) United States Patent
Johnson et al.

(10) Patent No.: US 12,630,358 B2
(45) Date of Patent: May 19, 2026

(54) WASTE CONTAINERS WITH UNIVERSAL BAG RECEPTACLE

(71) Applicant: MUNCHKIN, INC., Van Nuys, CA (US)

(72) Inventors: Kevin Douglas Johnson, Tarzana, CA (US); Steven Bryan Dunn, Beverly Hills, CA (US)

(73) Assignee: MUNCHKIN, INC., Van Nuys, CA (US)

( * ) Notice: Subject to any disclaimer, the term of this patent is extended or adjusted under 35 U.S.C. 154(b) by 0 days.

(21) Appl. No.: 18/811,707

(22) Filed: Aug. 21, 2024

(65) Prior Publication Data

US 2025/0066115 A1 Feb. 27, 2025

Related U.S. Application Data

(60) Provisional application No. 63/533,899, filed on Aug. 21, 2023.

(51) Int. Cl.

| | |
|---|---|
| ***B65F 1/10*** | (2006.01) |
| ***B65F 1/06*** | (2006.01) |
| ***B65F 1/16*** | (2006.01) |

(52) U.S. Cl.
CPC .................. *B65F 1/16* (2013.01); *B65F 1/06* (2013.01); *B65F 2001/1676* (2013.01); *B65F 2210/167* (2013.01); *B65F 2240/132* (2013.01)

(58) Field of Classification Search
CPC .... B65F 1/06; B65F 1/16; B65F 1/062; B65F 2001/1676; B65F 2210/167; B65F 2240/132
USPC ............. 220/495.08, 263, 908, 908.1, 254.3, 220/495.06
See application file for complete search history.

(56) References Cited

U.S. PATENT DOCUMENTS

2009/0127260 A1* 5/2009 Rousso .................. B65F 1/163 220/495.01
2018/0155123 A1* 6/2018 Parker ..................... B65F 1/163

* cited by examiner

*Primary Examiner* — Don M Anderson
*Assistant Examiner* — Elizabeth J Volz
(74) *Attorney, Agent, or Firm* — Robert Z. Evora; ArentFox Schiff LLP

(57) ABSTRACT

A diaper pail includes a housing and a lid assembly with a first lid that provides access to an interior of a flexible bag assembly, a second lid that provides access to the bag assembly's top structure, and a third lid cartridge that accommodates the bag assembly. An outer edge of the third lid cartridge forms a gap with the housing to allow a top portion of a bag through the gap. The lid assembly also includes a pair of overlapping planar sheets which pinch the bag to prevent odors from within the bag from passing to the outside.

18 Claims, 28 Drawing Sheets

WASTE CONTAINERS WITH UNIVERSAL BAG RECEPTACLE

CROSS REFERENCE TO RELATED APPLICATIONS

This application claims priority to U.S. Provisional Patent Application Ser. No. 63/533,899, filed Aug. 21, 2023, the content of which is hereby incorporated by reference herein in its entirety into this disclosure.

TECHNICAL FIELD

The subject disclosure relates generally to containers. More particularly, the present disclosure relates to waste containers with universal bag receptacle.

BACKGROUND

Most households possess at least one waste receptacle, while many households have multiple containers that hold or store waste therein. Diaper pails are specialized waste containers used by parents and other caregivers to temporarily store waste related to care of infants and young children. Soiled diapers are one of the most common articles of waste stored in diaper pails. Diapers, and waste more generally, often possess malodor and can exist in various states of decomposition, spoilage and decay. Waste can be a source of potentially harmful microorganisms such as bacteria, viruses, mold, fungus and other potentially harmful pathogens. Traditional waste receptacles thus present an environment for microorganisms to multiply, malodor to build and the process of decomposition to continue while the waste is stored therein.

SUMMARY

The present subject disclosure describes various waste containers that can accept any type of bag, and have a built in mechanism to cut off, seal, and/or separate an internal chamber that holds soiled material from an outside environment, which may be in close proximity to adults, children, and infants. The mechanism allows a user to insert a soiled diaper into a designated waste bag and have the bag automatically pinch off its open end so that the odor and potential harmful pathogens are automatically contained within the waste bag with no further manual or automated intervention required. This passive sealing process is designed to be simple, efficient, and cost-effective.

In one exemplary embodiment, the present subject disclosure is a diaper pail. The diaper pail includes a housing; and a lid assembly attached to the housing, the lid assembly having: a first lid that allows access to an interior of a flexible bag assembly housed within the housing; a second lid that allows access to a top structure of the flexible bag assembly housed within the housing; and a third lid cartridge that accommodates the flexible bag assembly, wherein an outer edge of the third lid cartridge creates a gap with an inner surface of the housing to allow a top portion of a bag created by the flexible bag assembly therethrough.

In another exemplary embodiment, the present subject disclosure is a diaper pail. The diaper pail includes a housing; and a lid assembly attached to the housing, the lid assembly having: a first lid that allows access to an interior of a flexible bag assembly having a bag and housed within the housing; a second lid that allows access to a top structure of the flexible bag assembly housed within the housing; a third lid cartridge that is pivotally attached to the second lid and accommodates the flexible bag assembly, wherein an outer edge of the third lid cartridge creates a gap with an inner surface of the housing to allow a top portion of the bag therethrough; and a pair of planar sheets that overlap with each other and pinch a portion of the bag formed by the flexible bag assembly.

In yet another exemplary embodiment, the present subject disclosure is a diaper pail. The diaper pail includes a housing having an upper end and a lower end; and a lid assembly attached to the upper end of the housing, the lid assembly having: a first lid pivotally attached to the upper end of the housing and allows access to an interior of a flexible bag assembly having a bag and housed within the housing; a second lid that allows access to a top structure of the flexible bag assembly housed within the housing; a third lid cartridge pivotally attached to the second lid and that accommodates a flexible bag assembly, wherein an outer edge of the third lid cartridge creates a gap with an inner surface of the housing to allow a top portion of the bag created by the flexible bag assembly therethrough; and a pair of planar sheets positioned within the third lid cartridge that overlap with each other and pinch a portion of the bag formed by the flexible bag assembly.

BRIEF DESCRIPTION OF THE DRAWINGS

Various exemplary embodiments of this disclosure will be described in detail, wherein like reference numerals refer to identical or similar components or steps. The accompanying drawings, which are incorporated in and constitute a part of this specification, illustrate embodiments of the subject disclosure and technical data supporting those embodiments, and together with the written description, serve to explain certain principles of the subject disclosure. With reference to the following figures, wherein.

DETAILED DESCRIPTION

The following detailed description references specific embodiments of the subject disclosure and accompanying figures, including the respective best modes for carrying out each embodiment. It shall be understood that these illustrations are by way of example and not by way of limitation. Particular embodiments of a bottle warmer will now be described in greater detail with reference to the figures.

Figure 1:
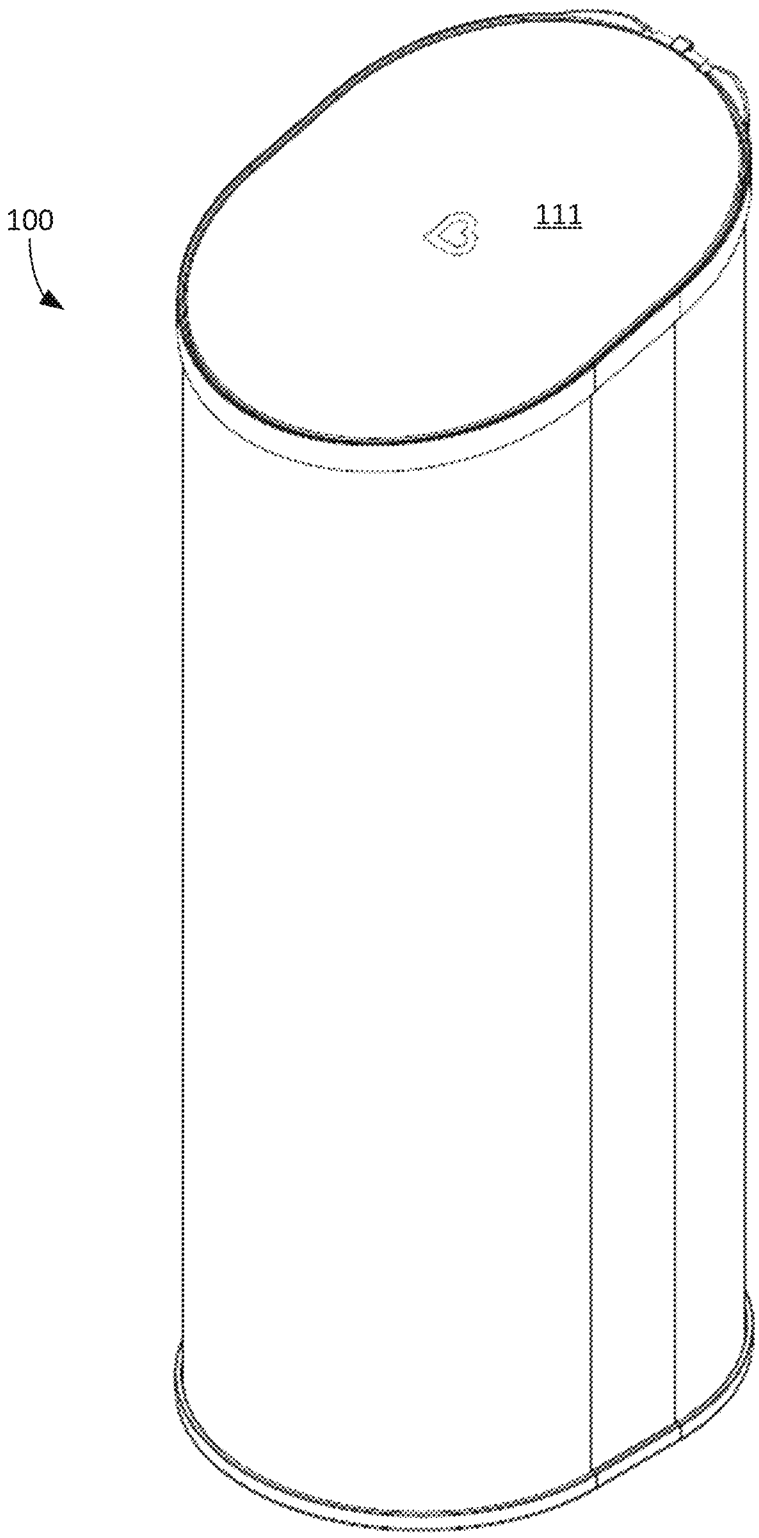
FIG. 1 is a front perspective view of a container, according to an exemplary embodiment of the present subject disclosure.
Figure 2:
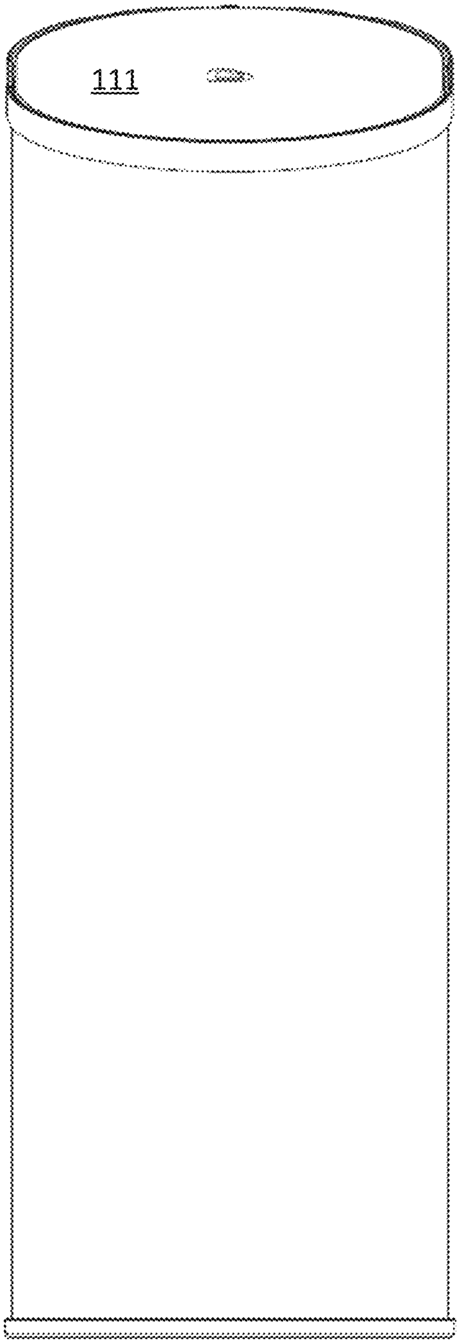
FIG. 2 is a front view of a container, according to an exemplary embodiment of the present subject disclosure.
Figure 3:
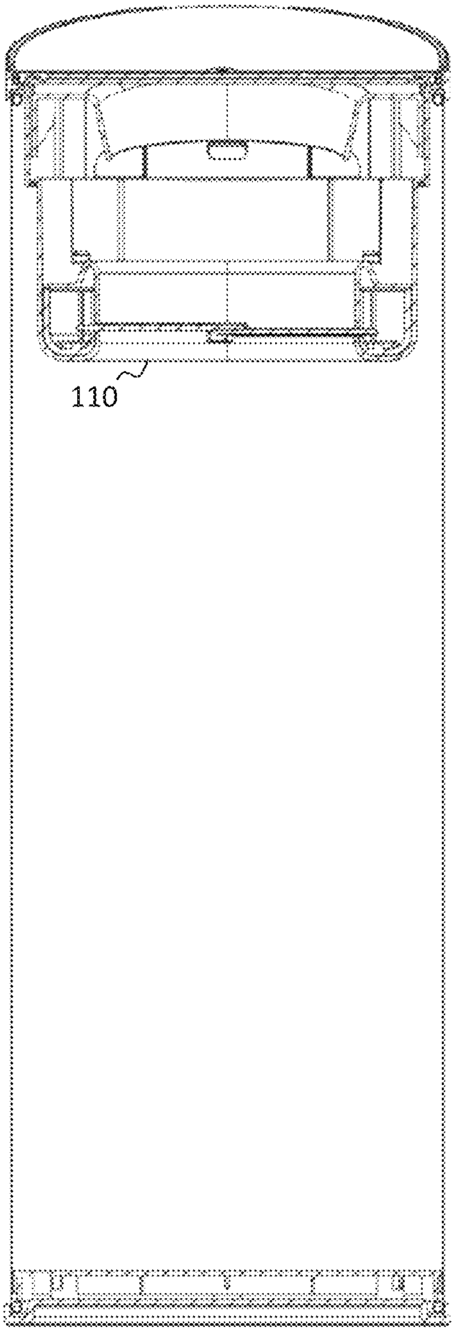
FIG. 3 is a front cross-sectional view of a container, according to an exemplary embodiment of the present subject disclosure.
Figure 4:
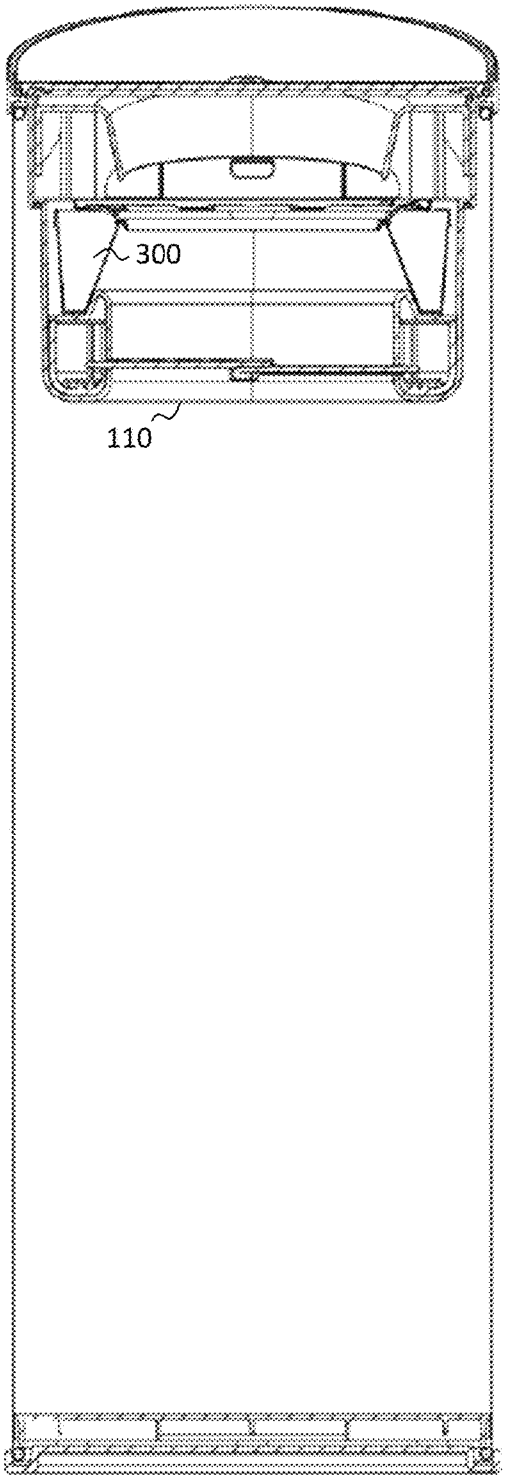
FIG. 4 is a front cross-sectional view of a container holding a cassette, according to an exemplary embodiment of the present subject disclosure.
Figure 5:
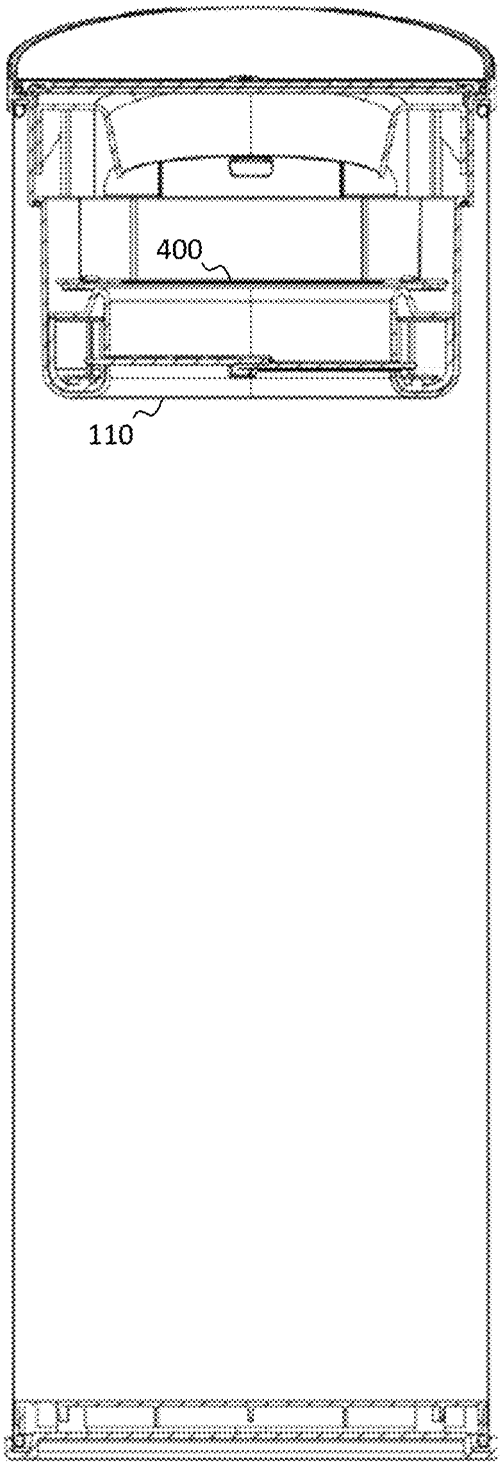
FIG. 5 is a front cross-sectional view of a container holding a single use bag assembly, according to an exemplary embodiment of the present subject disclosure.

FIG. 1 shows a perspective view of a waste container 100 according to the present subject disclosure. The container is shown as an oval cylindrical housing with a top end and a bottom end, but can take any shape. The container 100 has smooth outer edges and surfaces. FIG. 2 shows a front view and FIG. 3 shows a cross-sectional view of the container 100 along plane A-A (of the top view shown in FIG. 11). As shown in FIG. 3, container 100 includes a lid assembly 110 having three separate and independent lids, each pivotably independent, as described in more detail below. FIG. 4 shows container 100 with a lid assembly 110 housing a cassette 300. FIG. 5 shows container 100 with a lid assembly 110 housing a single use bag assembly 400.

Figure 6:
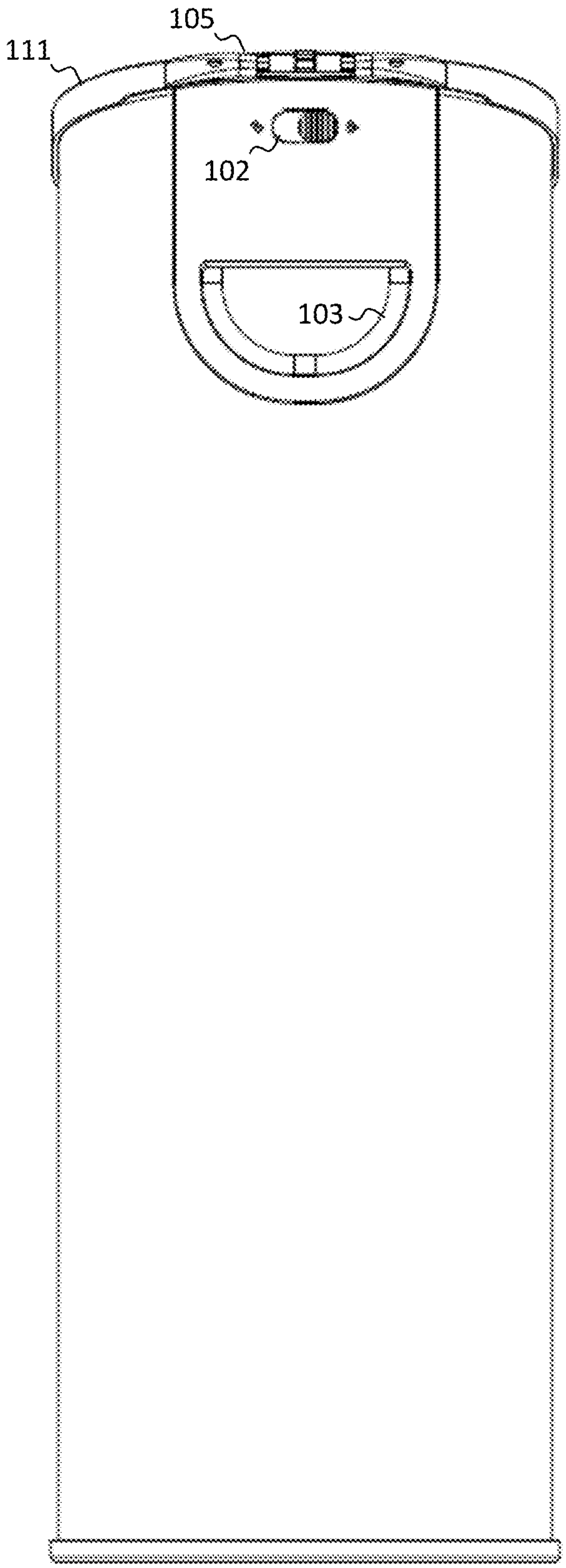
FIG. 6 is a back view of a container, according to an exemplary embodiment of the present subject disclosure.

FIG. 6 shows a back view of container 100. Hinge 105 allows the first lid 111 to rotate freely thereon. A locking mechanism 102 allows the top lid 111 or entire lid assembly 110 to be locked and thereby create a safety feature to prevent children (or animals) access to the interior of the container 100. An ergonomic handle 103 allows for the easy transport of container 100.

Figure 7:
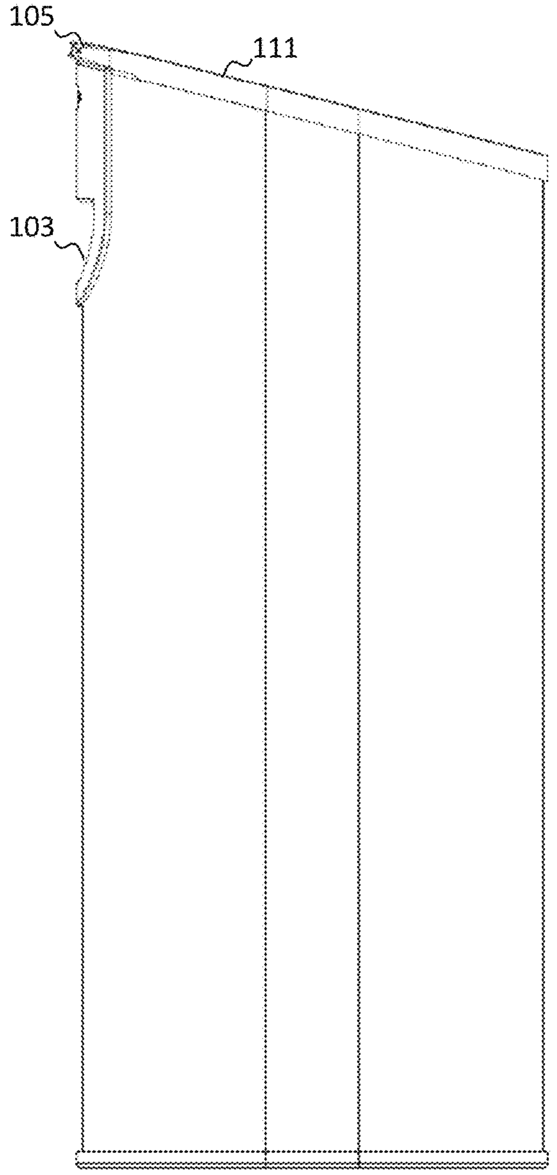
FIG. 7 is a side view of a container, according to an exemplary embodiment of the present subject disclosure.
Figure 8:
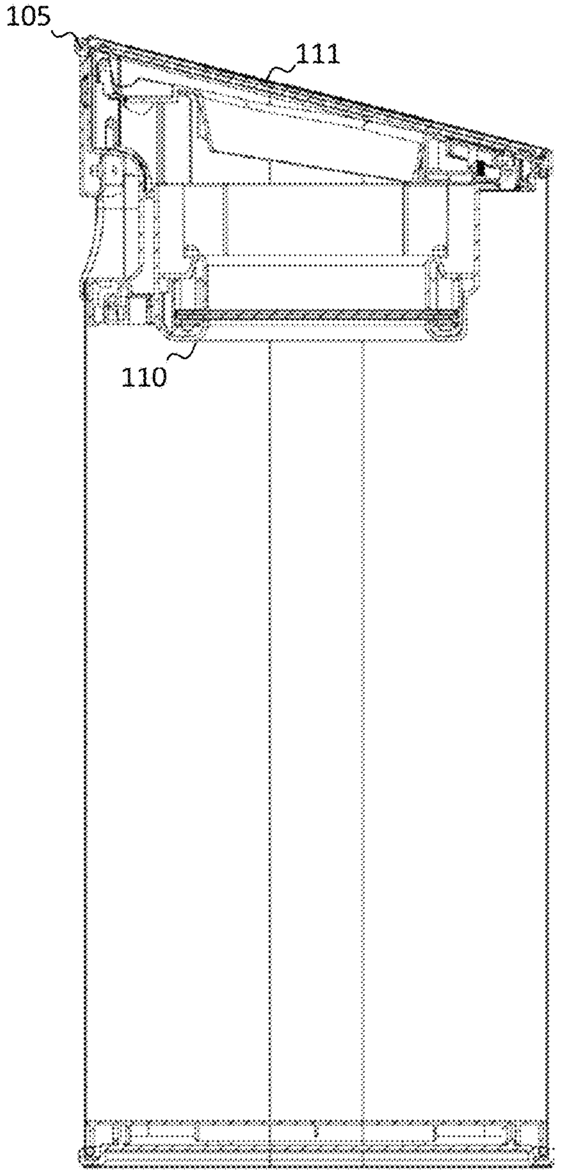
FIG. 8 is a side cross-sectional view of a container, according to an exemplary embodiment of the present subject disclosure.

FIG. 7 shows a side view of container 100. External hinge 105 allows the opening of the lid assembly 110. FIG. 8 shows a cross-sectional view of container 100 along plane B-B (of the top view shown in FIG. 11), including a cross-sectional view of the lid assembly 110. As shown in the figures, the back side of the container 100 is higher than the front side of the container 100. This positioning allows for more ergonomic ease of insertion of soiled diapers within container 100, as the lower side is positioned towards the user, thereby allowing the insertion of soiled diapers to be more convenient.

Figure 9:
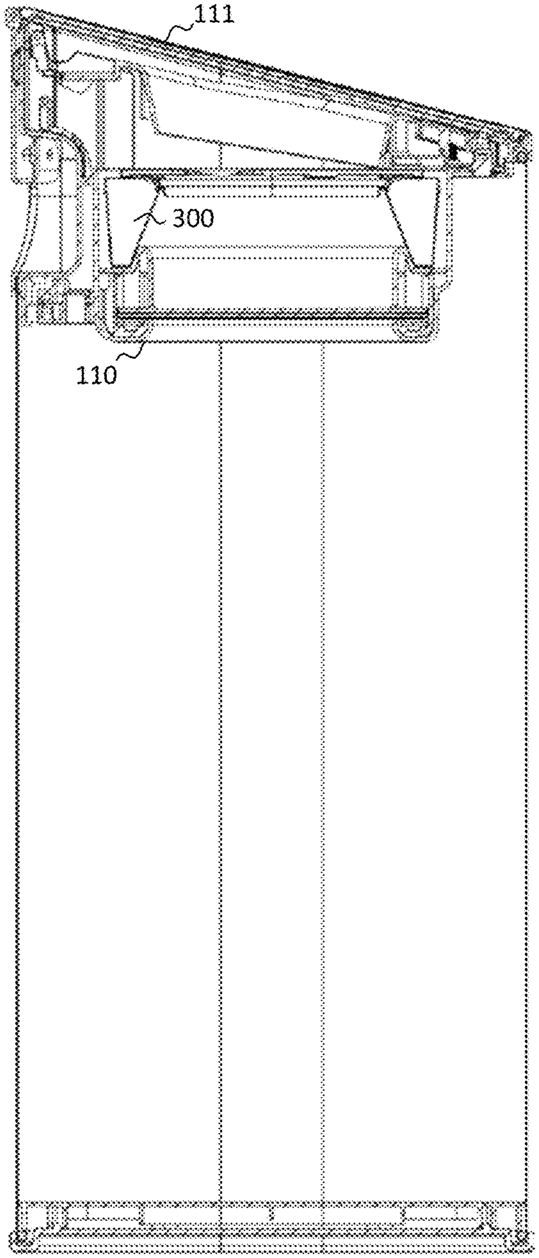
FIG. 9 is a side cross-sectional view of a container holding a cassette, according to an exemplary embodiment of the present subject disclosure.
Figure 10:
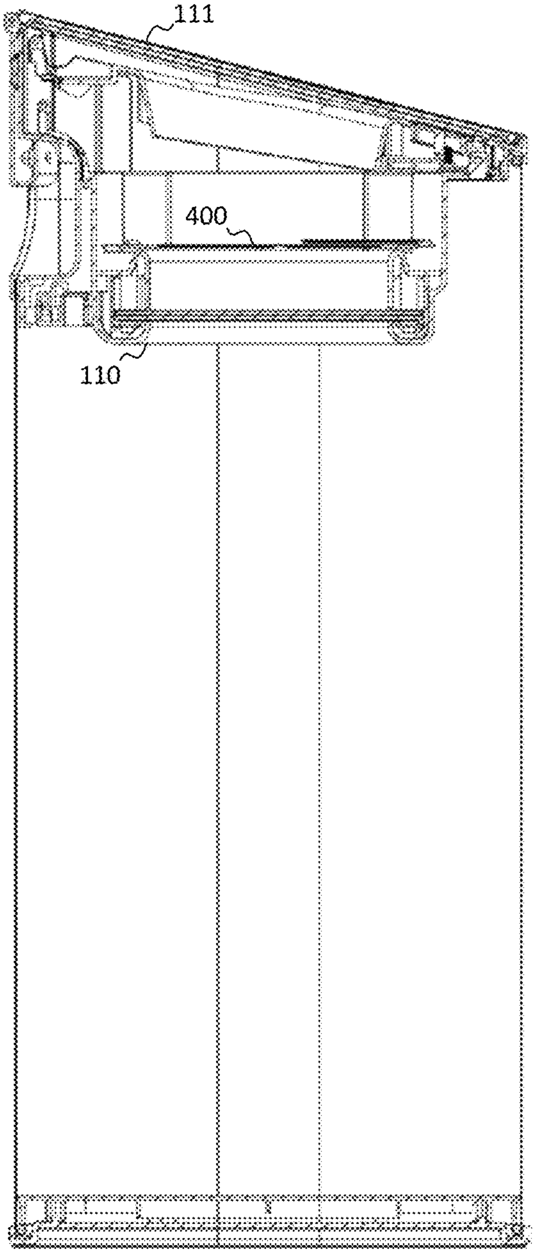
FIG. 10 is a side cross-sectional view of a container holding a single use bag assembly, according to an exemplary embodiment of the present subject disclosure.

FIG. 9 shows a cross-sectional view of container 100 including a cross-sectional view of the lid assembly 110 accommodating a cassette 300. FIG. 10 shows a cross-sectional view of container 100 including a cross-sectional view of the lid assembly 110 accommodating a singled use bag assembly 400.

Figure 11:
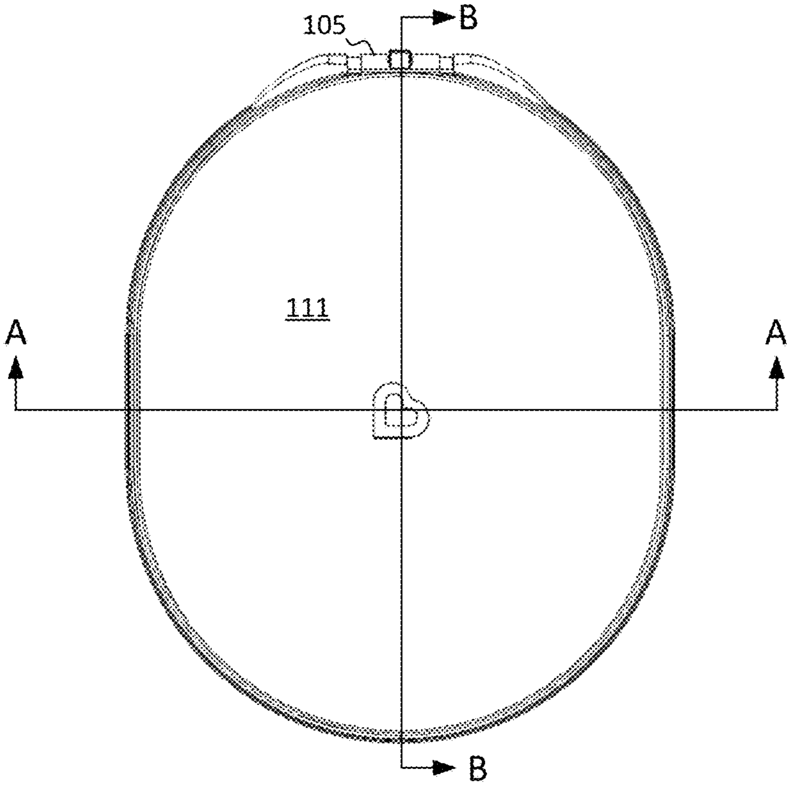
FIG. 11 is a top view of a container, according to an exemplary embodiment of the present subject disclosure.
Figure 12:
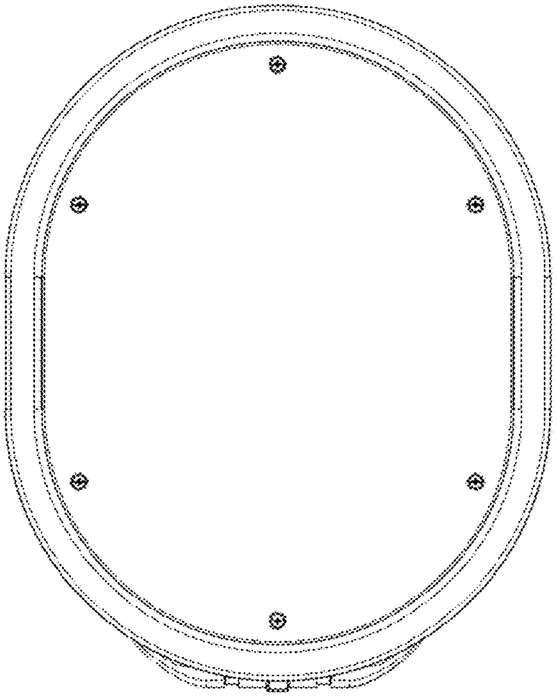
FIG. 12 is a bottom view of a container, according to an exemplary embodiment of the present subject disclosure.

FIG. 11 shows a top view and FIG. 12 shows a bottom view of container 100. External hinge 105 allows the opening of the lid assembly 110.

Figure 13:
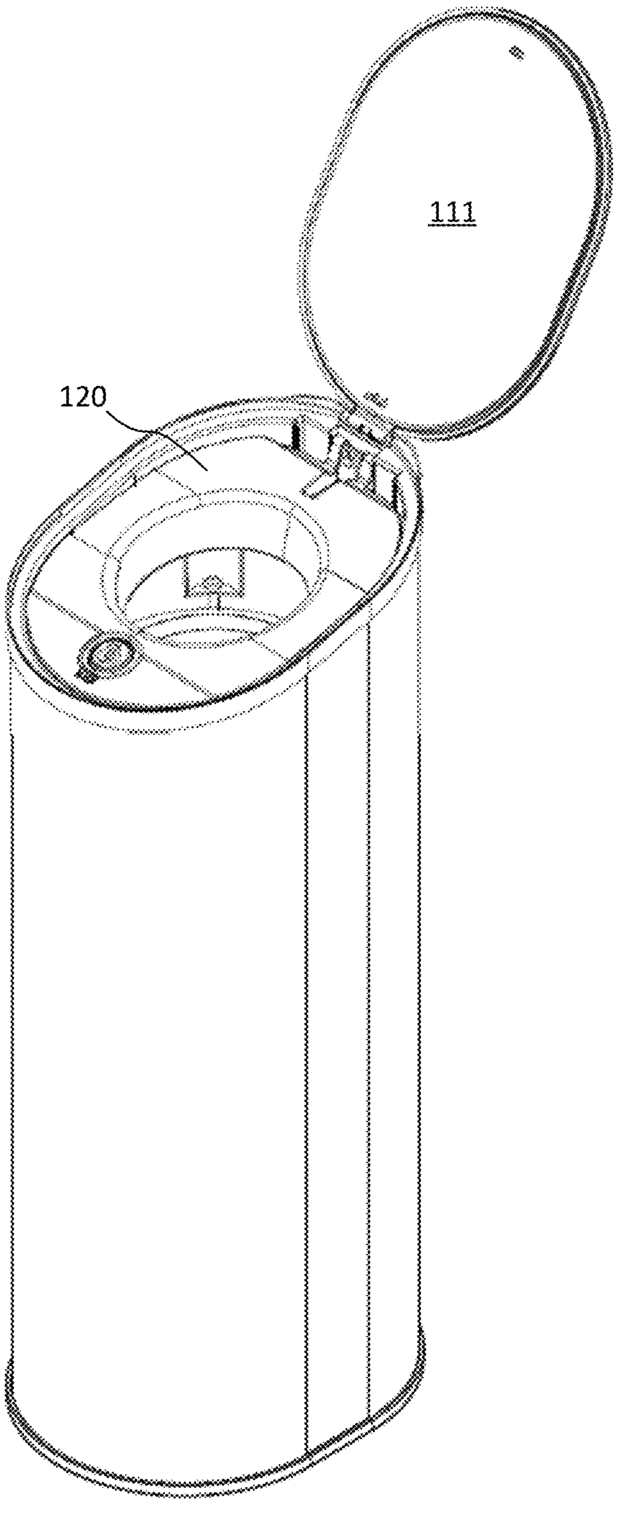
FIG. 13 is a front perspective view of a container with a first lid open, according to an exemplary embodiment of the present subject disclosure.
Figure 14:
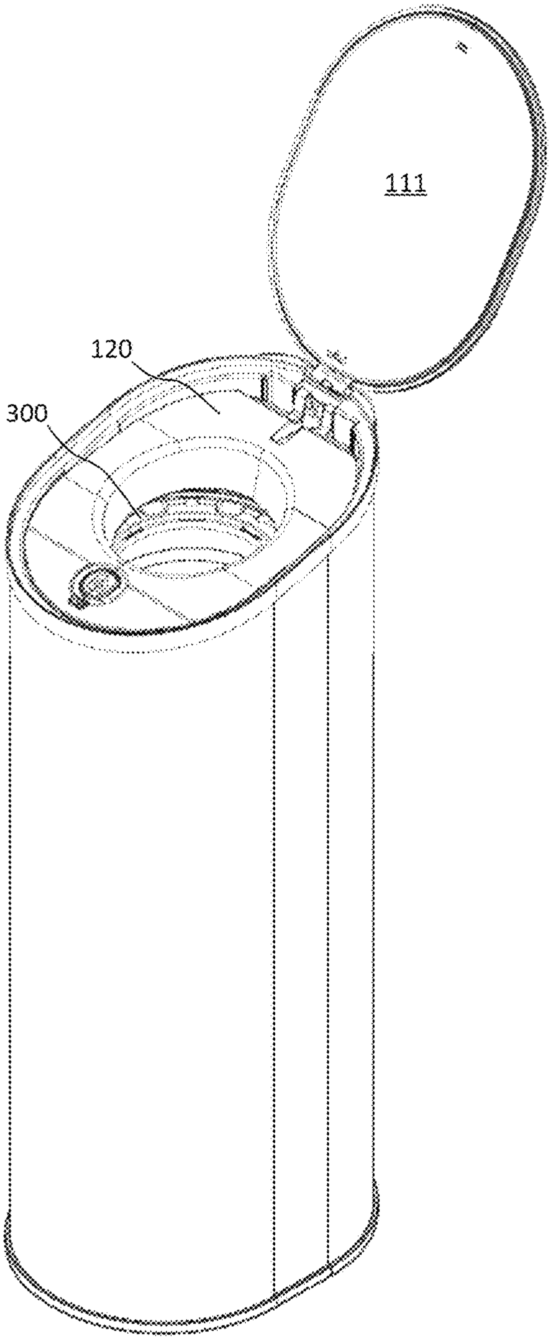
FIG. 14 is a front perspective view of a container with a first lid open and a cassette positioned within the container, according to an exemplary embodiment of the present subject disclosure.
Figure 15:
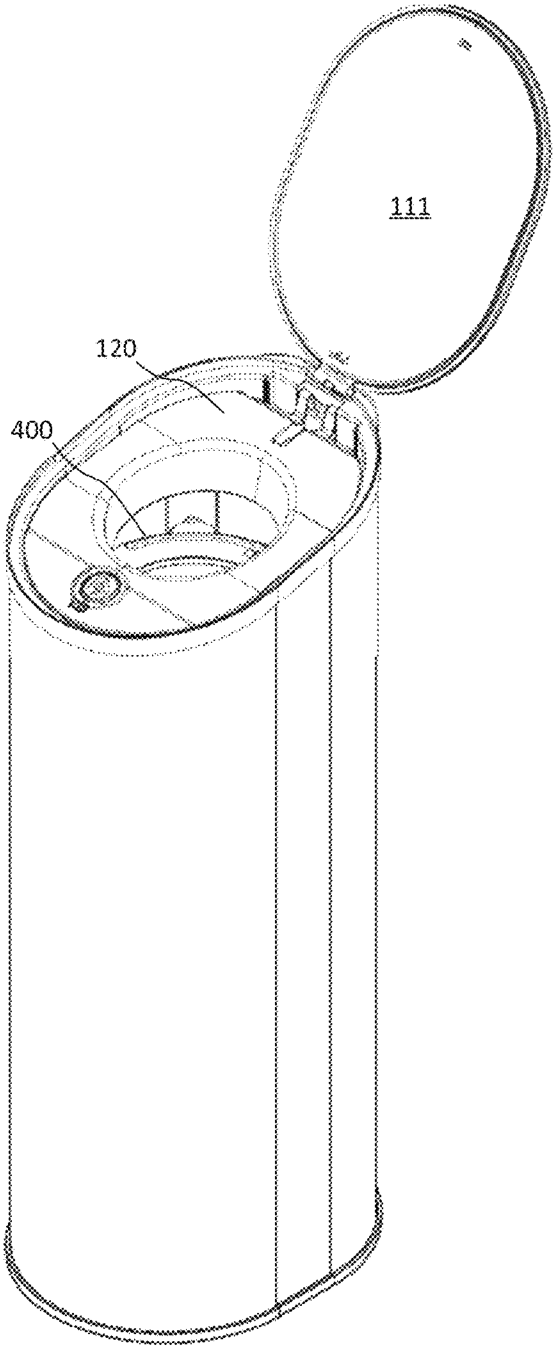
FIG. 15 is a front perspective view of a container with a first lid open and a single use bag assembly positioned within the container, according to an exemplary embodiment of the present subject disclosure.

FIG. 13 shows a perspective view of container 100 with a raised first lid 111. FIG. 14 shows a perspective view of container 100 with a raised first lid 111 and accommodating a cassette 300. FIG. 15 shows a perspective view of container 100 with a raised first lid 111 and accommodating a single use bag assembly 400.

Figure 16:
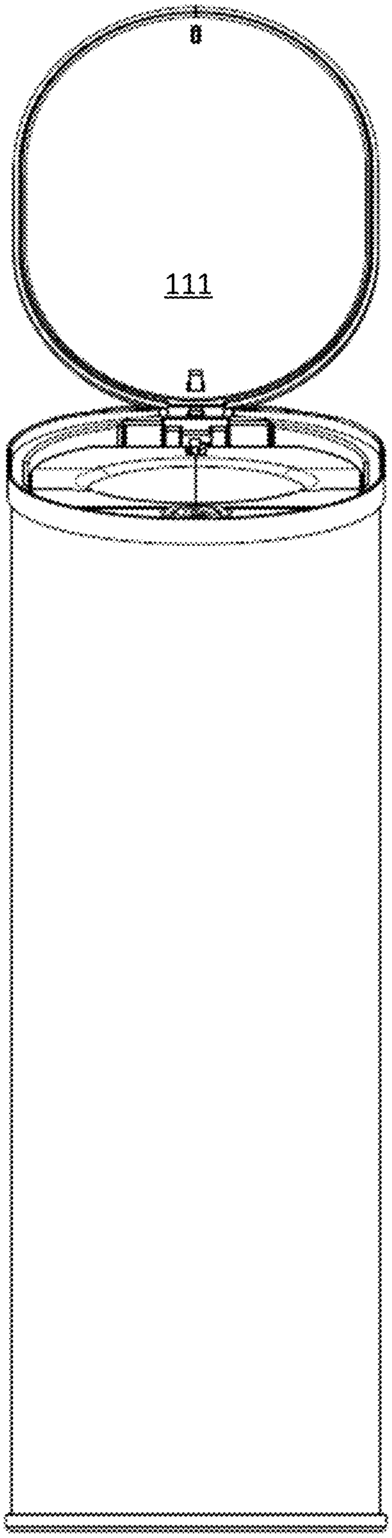
FIG. 16 is a front view of a container with a first lid open, according to an exemplary embodiment of the present subject disclosure.
Figure 17:
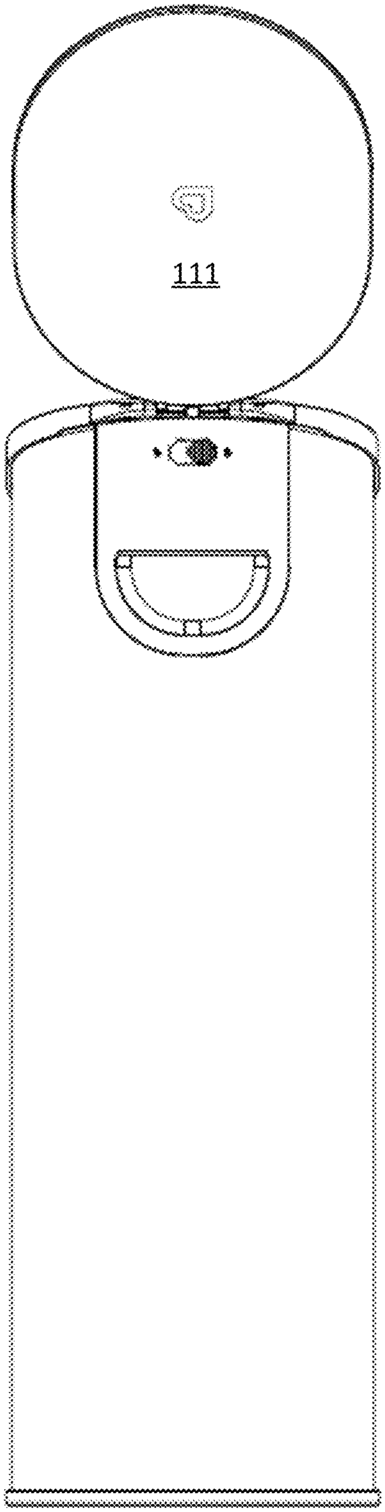
FIG. 17 is a back view of a container with a first lid open, according to an exemplary embodiment of the present subject disclosure.

FIG. 16 shows a front view of container 100 with a raised first lid 111. FIG. 17 shows a back view of container 100 with a raised first lid 111.

Figure 18:
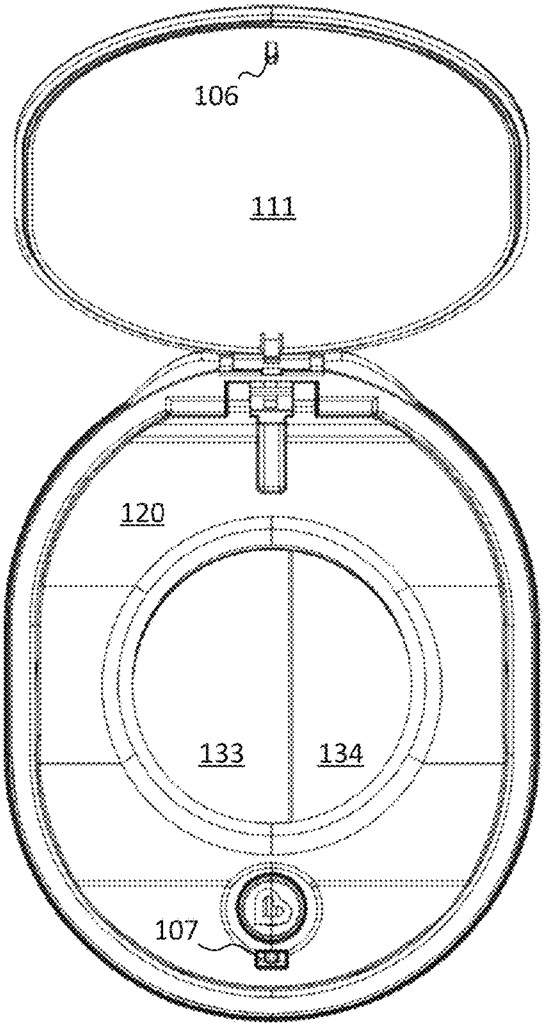
FIG. 18 is a top view of a container with a first lid open, according to an exemplary embodiment of the present subject disclosure.
Figure 19:
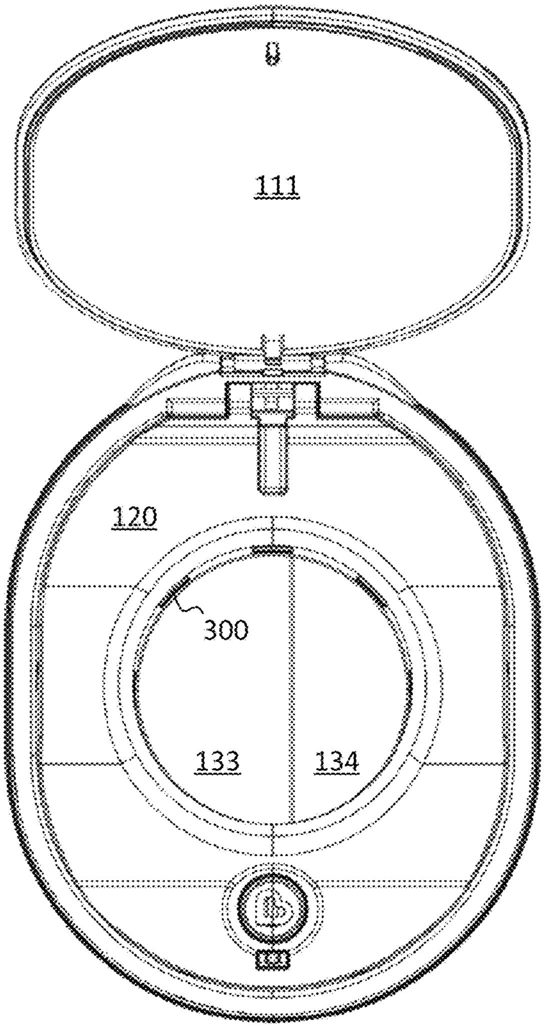
FIG. 19 is a top view of a container with a first lid open and holding a cassette, according to an exemplary embodiment of the present subject disclosure.

FIG. 18 shows a top view of container 100 with a raised first lid 111. FIG. 19 shows a top view of container 100 with a raised first lid 111 and accommodating a cassette 300.

As shown in FIG. 18 and other drawings, the closing mechanism of the first lid 111 is through a snap and release spring mechanism with a projection end 106 and a mating receiving end 107. The details have not been shown but would be appreciated by one having ordinary skill in the art. Other closing mechanisms are also possible and within the purview of the present subject disclosure.

Figure 20:
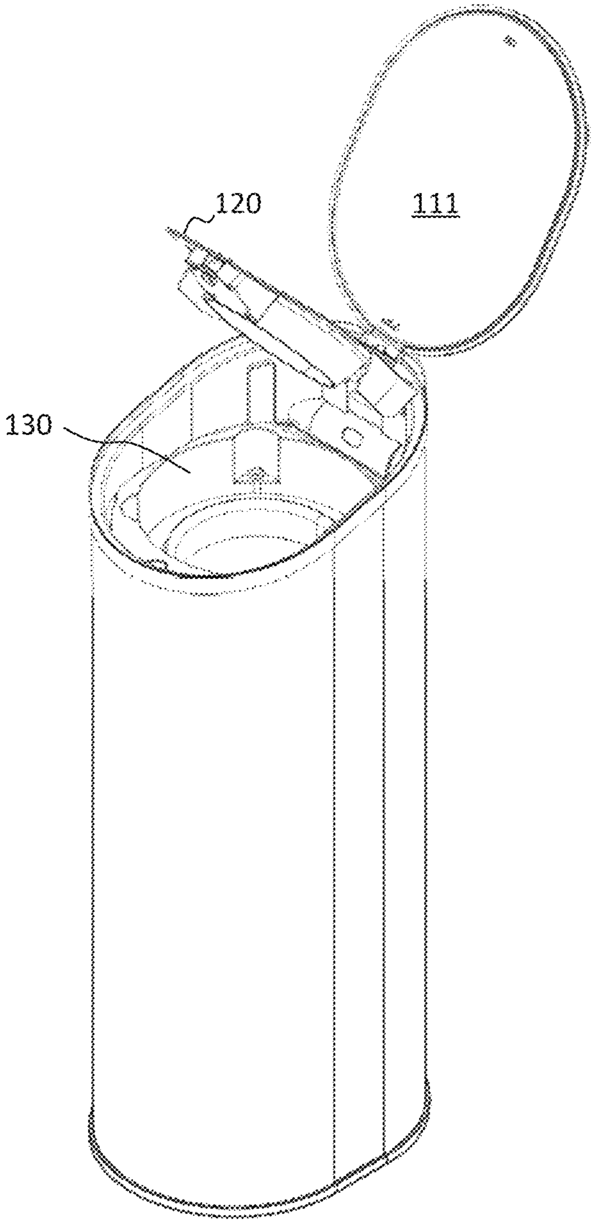
FIG. 20 is a front perspective view of a container with a first lid open and second lid partially open, according to an exemplary embodiment of the present subject disclosure.
Figure 21:
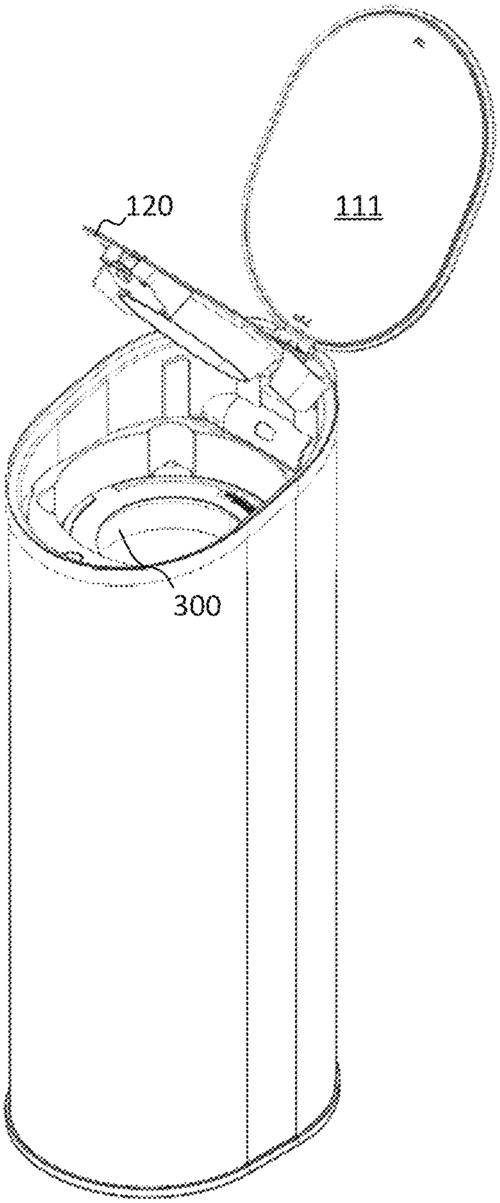
FIG. 21 is a front perspective view of a container with a first lid open and second lid partially open holding a cassette, according to an exemplary embodiment of the present subject disclosure.
Figure 22:
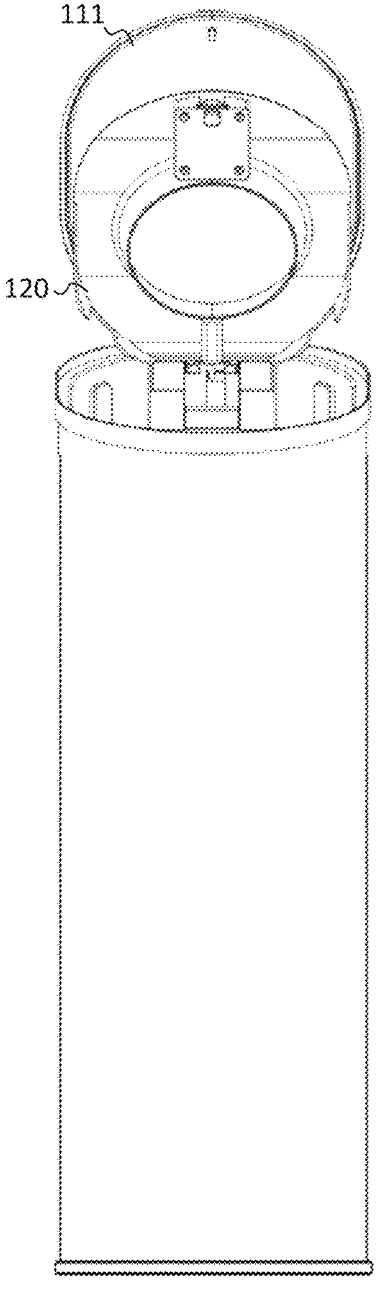
FIG. 22 is a front view of a container with a first lid open and second lid partially open, according to an exemplary embodiment of the present subject disclosure.
Figure 23:
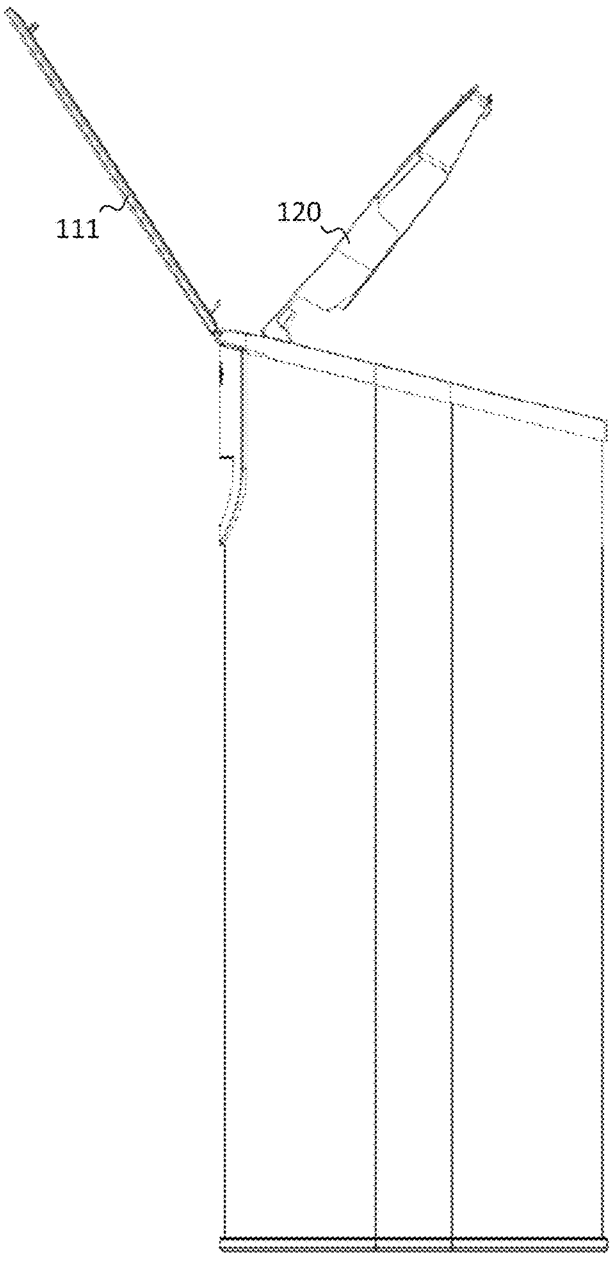
FIG. 23 is a side view of a container with a first lid open and second lid partially open, according to an exemplary embodiment of the present subject disclosure.

FIG. 20 shows a perspective view of container 100 with a raised first lid 111 and a partially raised second lid 120. FIG. 21 shows a perspective view of container 100 with a raised first lid 111 and a partially raised second lid 120, accommodating a cassette 300 therein. FIGS. 22 and 23 show front and side views, respectively, of container 100 with a raised first lid 111 and a partially raised second lid 120.

Figure 24:
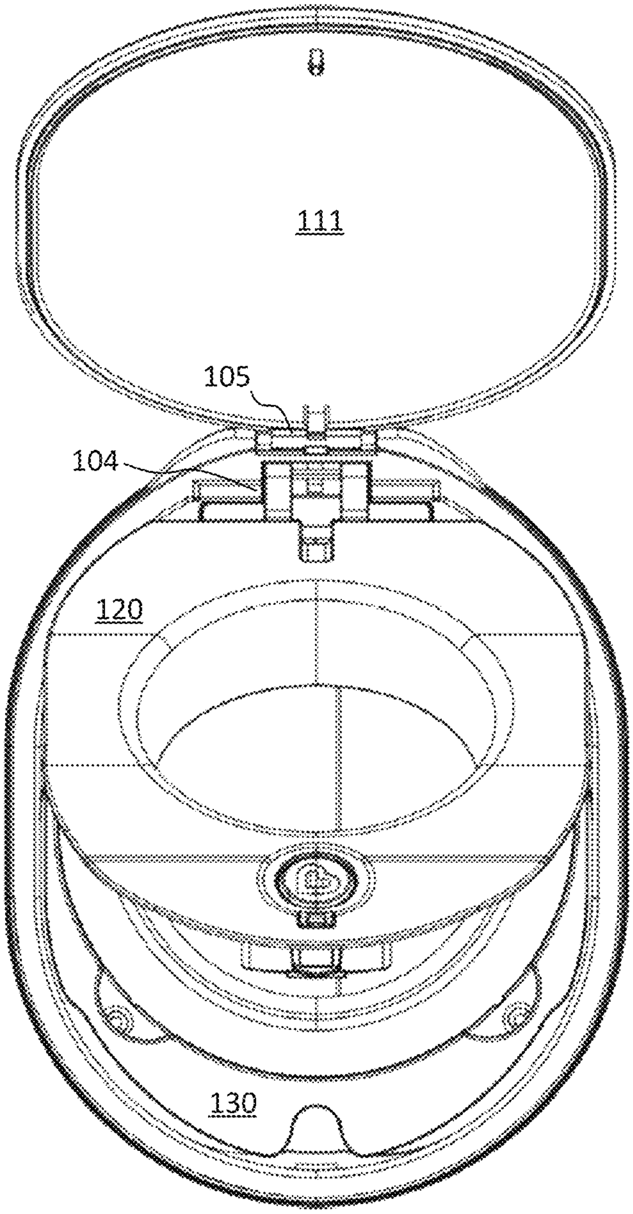
FIG. 24 is a top view of a container with a first lid open and second lid partially open, according to an exemplary embodiment of the present subject disclosure.

FIG. 24 shows a top view of container 100 with a raised first lid 111 and a partially raised second lid 120. A cassette 300 is positioned within the lid assembly 110. A first external hinge 105 allows for rotation of the first lid 111, and a second internal hinge 104 allows for rotation of the second lid 120 and third lid cartridge 130.

It should be noted that container 100, cassette 300, and single use bag assembly 400, as described in this disclosure, are similar in function and interaction (but different in structure as shown in the figures) to the ones shown and described in Applicant's co-pending applications, U.S. patent application Ser. No. 17/165,890, entitled, "Container for Receiving Multiple Flexible Bag Assemblies," and U.S. patent application Ser. No. 17/338,628, entitled, "Ultraviolet Light Sterilizing Waste Containers," and U.S. patent application Ser. No. 17/889,367, entitled, "Cassette for Dispensing Pleated Tubing," all of which are incorporated by reference herein in their entirety into this disclosure. As used herein and throughout this disclosure, a flexible bag assembly will mean, a cassette 300 containing a flexible bag, a single use bag 400 with an attachment frame 401, a standard bag 500, or the like.

Figure 25:
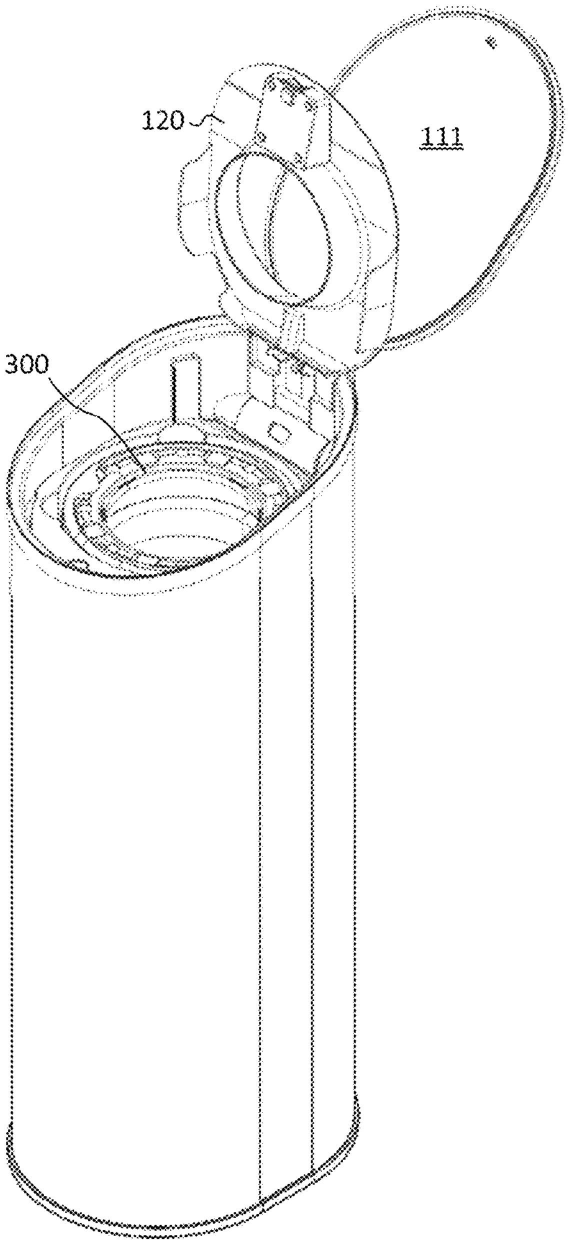
FIG. 25 is a front perspective view of a container with a first lid open and second lid partially open holding a cassette, according to an exemplary embodiment of the present subject disclosure.
Figure 26:
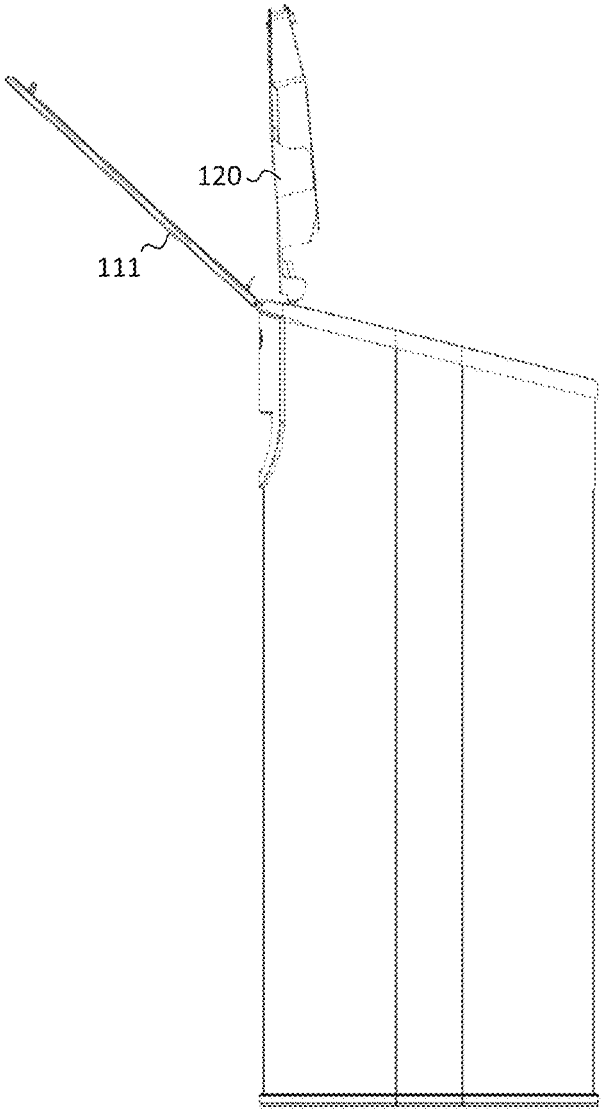
FIG. 26 is a side view of a container with a first lid open and second lid partially open, according to an exemplary embodiment of the present subject disclosure.

FIG. 25 shows a perspective view of container 100 with raised first lid 111 and second lid 120, accommodating a cassette 300 positioned therein. FIG. 26 shows a side view of container 100 with a raised first lid 111 and second lid 120.

Figure 27:
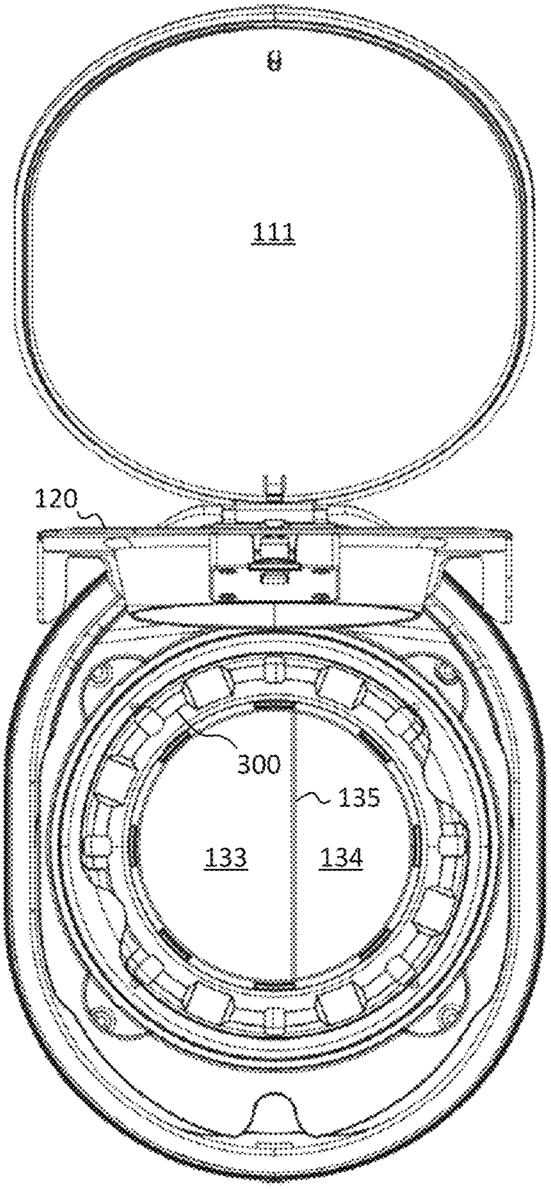
FIG. 27 is a top view of a container with a first lid open and second lid open and a cassette positioned within the container, according to an exemplary embodiment of the present subject disclosure.
Figure 28:
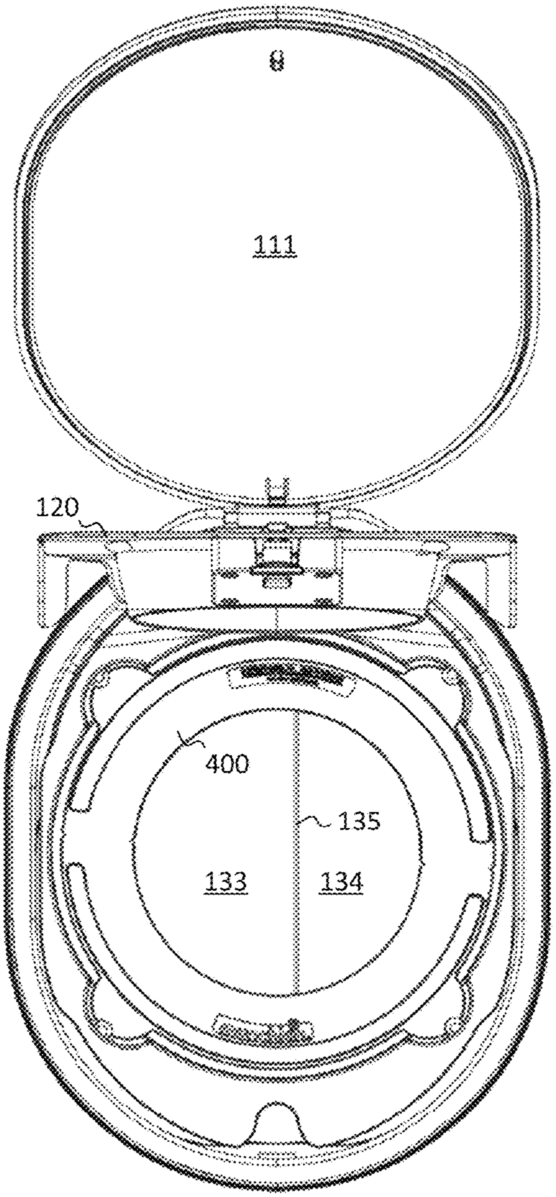
FIG. 28 is a top view of a container with a first lid open and second lid open and a single use bag assembly positioned within the container, according to an exemplary embodiment of the present subject disclosure.

FIG. 27 shows a top view of container 100 with raised first lid 111 and second lid 120, and cassette 300 in position on the third lid cartridge 130. FIG. 27 shows a top view of container 100 with raised first lid 111 and second lid 120, and downward view of a cassette 300 in position on the third lid cartridge 130. FIG. 28 shows a top view of container 100 with raised first lid 111 and second lid 120, and downward view of a single use bag assembly 400 in position on the third lid cartridge 130.

Figure 29:
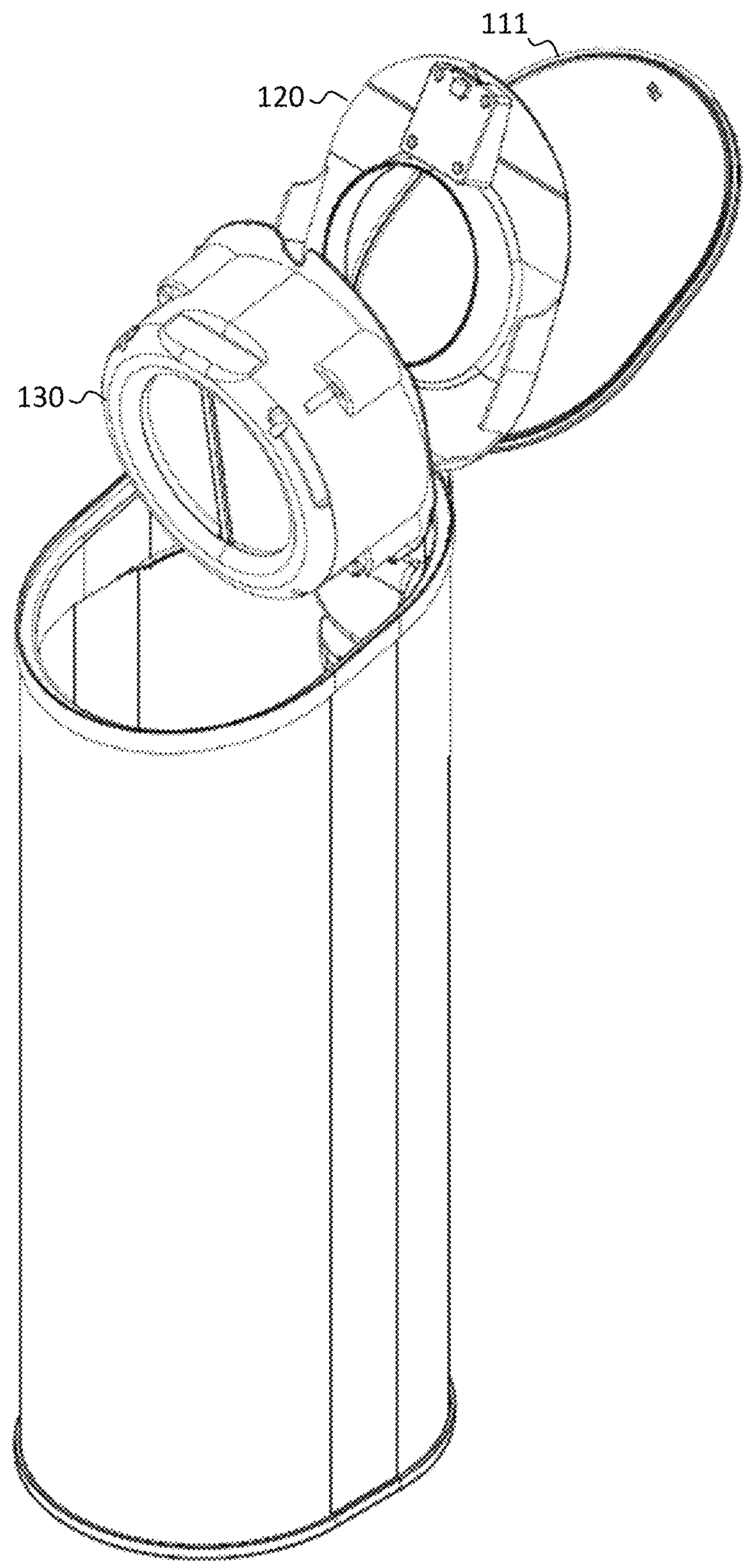
FIG. 29 is a front perspective view of a container with a lid assembly open, according to an exemplary embodiment of the present subject disclosure.
Figure 30:
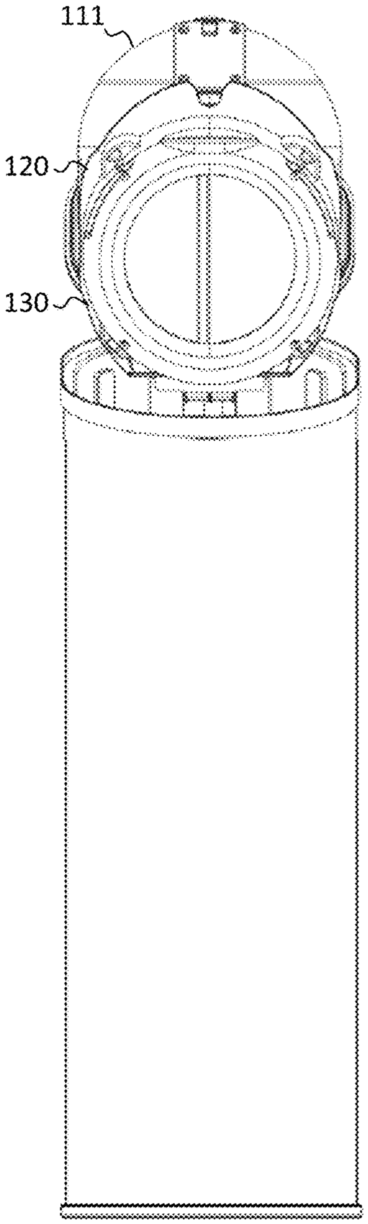
FIG. 30 is a front view of a container with a lid assembly open, according to an exemplary embodiment of the present subject disclosure.
Figure 31:
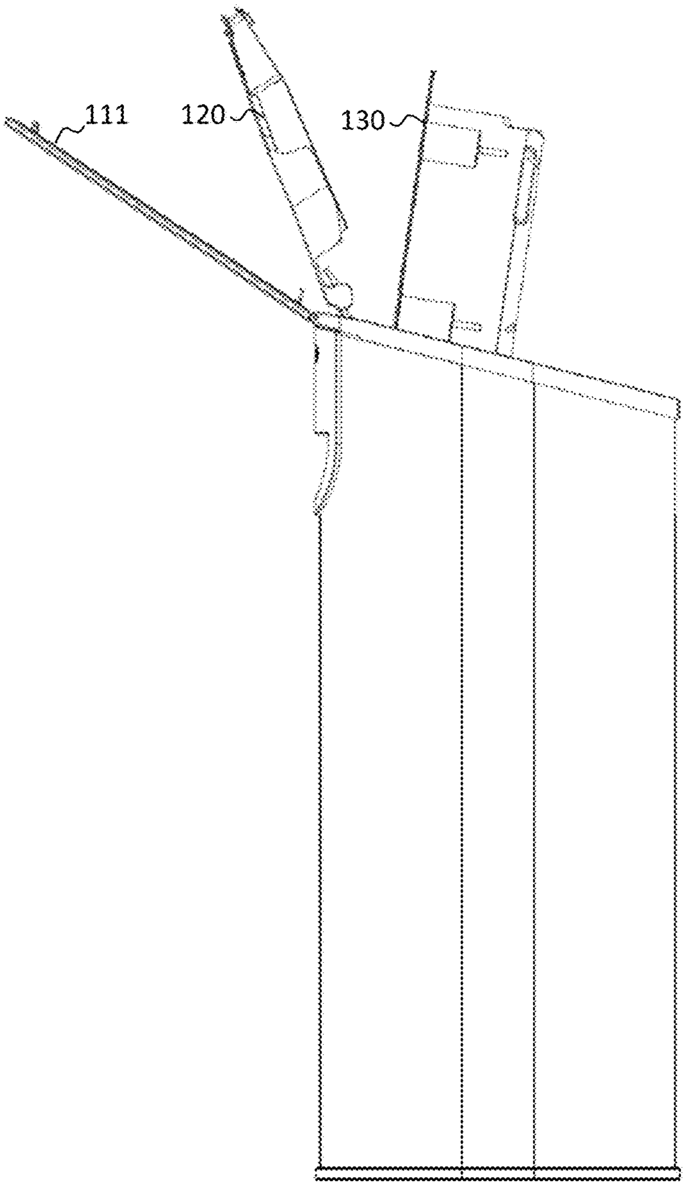
FIG. 31 is a side view of a container with a lid assembly open, according to an exemplary embodiment of the present subject disclosure.
Figure 32:
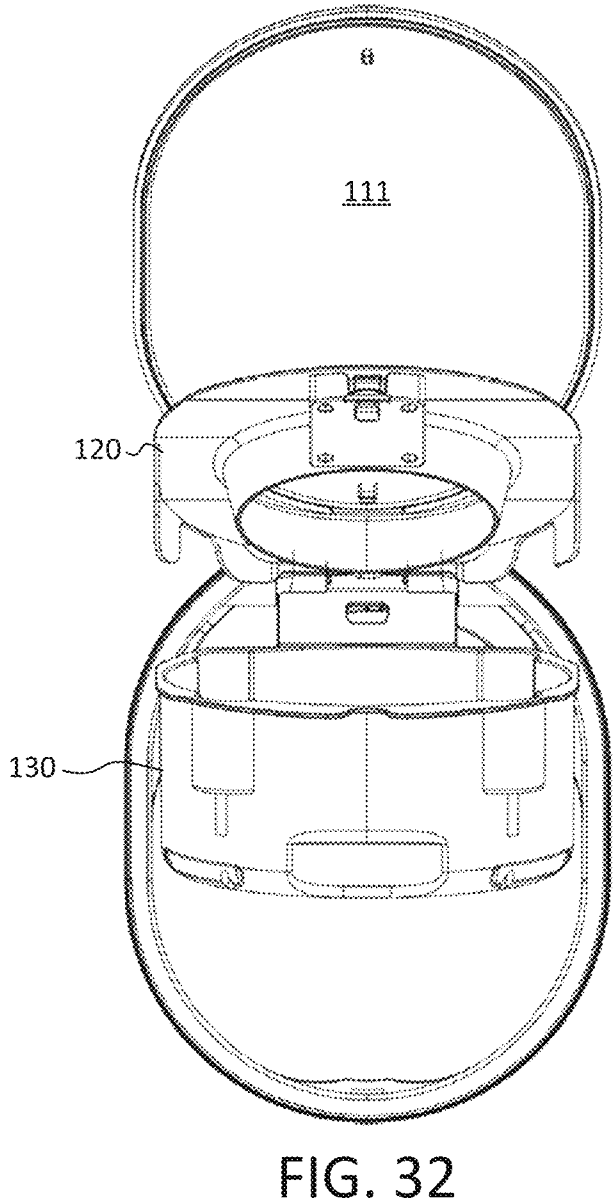
FIG. 32 is a top view of a container with a lid assembly open, according to an exemplary embodiment of the present subject disclosure.

FIG. 29 shows a perspective view of container 100 with raised lid assembly 110, which includes first lid 111, second lid 120, and third lid cartridge 130. FIG. 30 shows a front view of container 100 with raised lid assembly 110. FIG. 31 shows a side view of container 100 with raised lid assembly 110. FIG. 32 shows a top view of container 100 with raised lid assembly 110. As shown in FIG. 24, first lid 111 rotates about external hinge 105, and second lid 120 and third lid cartridge 130 rotate around internal hinge 104.

Figure 35:
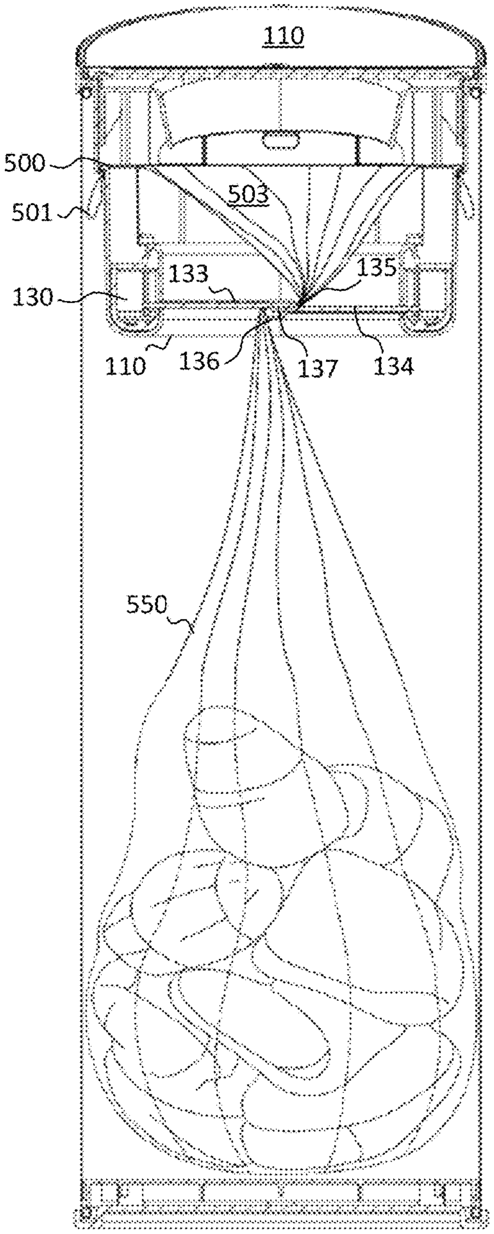
FIG. 35 is a cross-sectional view of a standard bag placement within a container with extended bag holding soiled material, according to an exemplary embodiment of the present subject disclosure.
Figure 40:
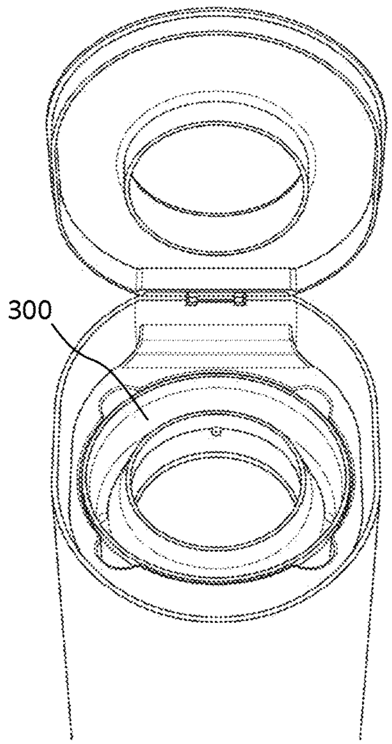
FIG. 40 is a perspective view of a container top portion with first lid and second lid lifted, and a cassette inserted therein, according to an exemplary embodiment of the present subject disclosure.
Figure 41:
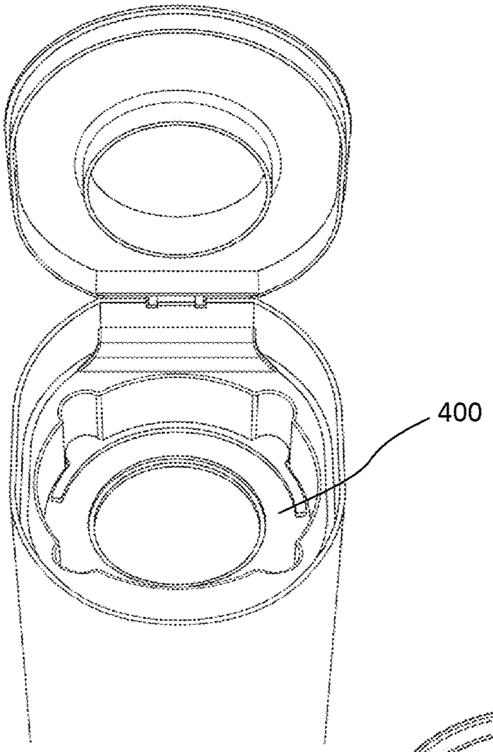
FIG. 41 is a perspective view of a container top portion with first lid and second lid lifted, and a single use bag assembly inserted therein, according to an exemplary embodiment of the present subject disclosure.

A detailed review and discussion of the third lid cartridge 130 is presented in Applicant's co-pending application, entitled "Waste Containers with Odor Seals," filed concurrently with this application, and incorporated by reference herein in its entirety into this disclosure. Briefly, the third lid cartridge 130 serves multiple purposes. One function is to secure a sheet or single bag thereon, such as cassette 300, as shown in FIG. 40, or single use bag assembly 400, as shown in FIG. 41, or standard bag 500, as shown in FIG. 35. Another function of the third lid cartridge 130 is to create an odor barrier between the interior of the bag inside of the container 100 and the environment outside of the container 100. The design of the third lid cartridge 130 is similar to a bowl or saucer, with an outer rim which surrounds an inner vertical wall. Within the inner vertical wall are a pair of nonplanar sheets 133 and 134, which overlap at linear gap portion 135. The third lid cartridge 130 may be modular and replaceable so that a user may decide to replace the third lid cartridge 130 as needed after it has been worn out from repeated use or has broken.

As shown in FIGS. 27-28 and 33-35, planar sheets 133 and 134 are discontinuous such that the top surface of planar sheet 133 is positioned higher than the top surface of planar sheet 134. Additionally, as shown in the figures, the right most end of the planar sheet 133 ends at a position which is to the right of the left most end of the planar sheet 134. The end point of the planar sheet 133 creates a linear gap 135 which creates an area of overlap 137 between planar sheet 133 and planar sheet 134, and spans and acts as a chord across the circular section created by the vertical wall. See, for example FIGS. 33-35. In these figures, the linear gap 135 is shown to the right of the vertical diameter which would run from the 6 to the 12 o'clock position on the circular planar sheet assembly 133, 134, as shown in FIGS. 27-28. This is so that the overlapped area 137 would be maximized, therefore allowing a great area to push soiled diaper therethrough.

Further, as shown in the figures, planar sheet 134 folds over to create a U-shaped left most end 136, positioned underneath and to the left of the right end (at 135) of the planar sheet 133. This U-shaped end 136 allows bags to be positioned and secured within the linear gap 135, as will be shown and discussed in further detail below. A downward push of the bag through linear gap 135 creates a contact with the U-shaped curve 136 such that any upward motion in the bag would be resisted by the end of the U-shaped curve 136, which would contact the surface of the bag. This would allow for unidirectional (downward) movement of the bag through gap 135.

Figure 33:
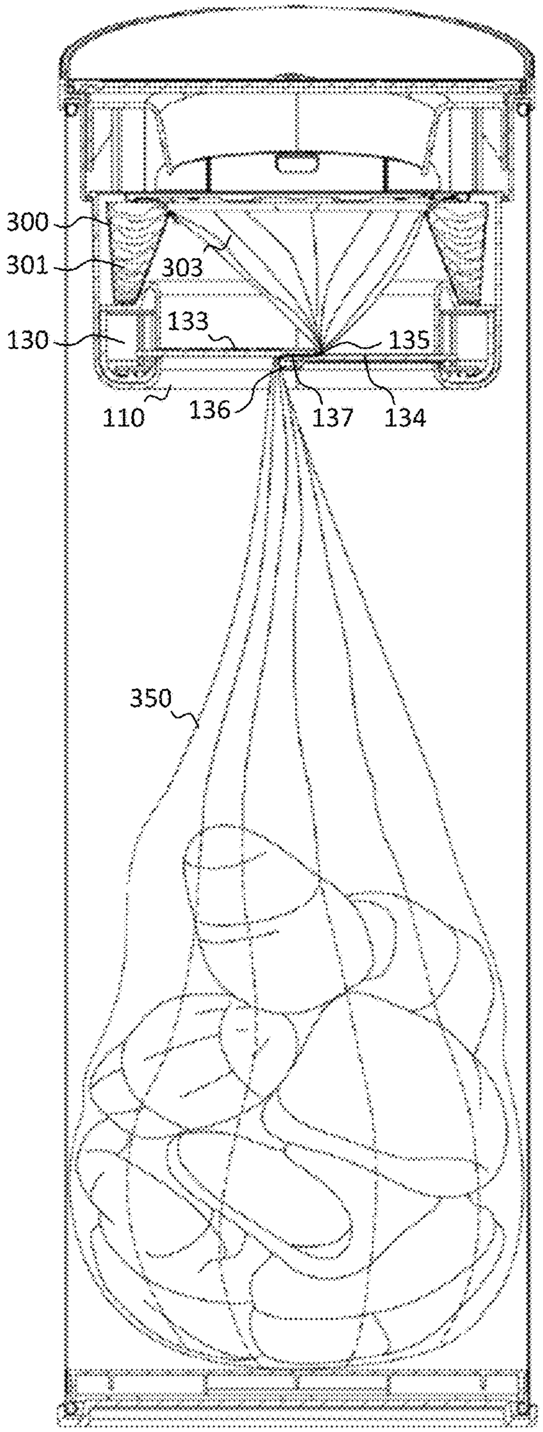
FIG. 33 is a cross-sectional view of a cassette within a container with extended bag holding soiled material, according to an exemplary embodiment of the present subject disclosure.

FIG. 33 shows a cross-sectional view of a cassette 300 in use within a container 100, according to the present subject disclosure. The figure shows cassette 300 positioned atop the third lid cartridge 130 with a rolled or stacked material 301 which has been pulled through and pushed within linear gap 135. A user places a soiled diaper into the open top portion of the bag 303 and pushes down so that the soiled diaper is pushed through the opened linear gap 135, which then separates the overlapped contact area 137 formed between the two planar sheets 133, 134. Once the soiled material pushes through the overlapped contact area 137, it drops into the open bag 350. When the soiled diaper has cleared the overlapped contact area 137, the planar surfaces 133, 134 make close contact again in the contact area 137, and gap 135 closes up so that the portion of the bag between the open bag 303 and the bottom bag 350 is sandwiched together between the two overlapping surfaces 133, 134. The odor and harmful contents inside the bag 350 are therefore maintained within the bag 350 and not allowed to seep through to the open end 303.

Figure 34:
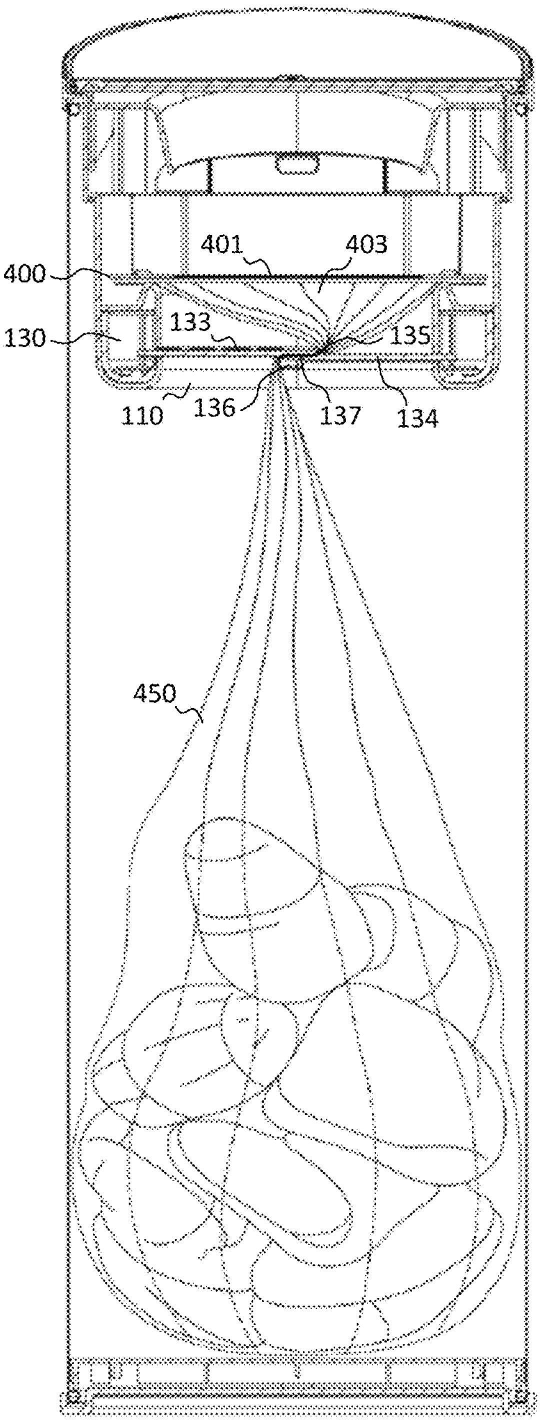
FIG. 34 is a cross-sectional view of a single use bag assembly within a container with extended bag holding soiled material, according to an exemplary embodiment of the present subject disclosure.

FIG. 34 shows a cross-sectional view of a single use bag assembly 400 in use within a container 100, according to the present subject disclosure. FIG. 34 shows a more detailed view of the single use bag 400 having an attachment frame 401 which is positioned atop the third lid cartridge 130 with a bag that has been pulled through and pushed within the linear gap 135. A user places a soiled diaper into the open top portion of the bag 403 and pushes down so that the soiled diaper is pushed through the opened linear gap 135, which then separates the overlapped contact area 137 formed between the two planar sheets 133, 134. Once the soiled material pushes through the overlapped contact area 137, it drops into the open bag 450. When the soiled diaper has cleared the overlapped contact area 137, the planar surfaces 133, 134 make close contact again in the contact area 137, and gap 135 closes up so that the portion of the bag between the open bag 403 and the bottom bag 450 is sandwiched together between the two overlapping surfaces 133, 134. The odor and harmful contents inside the bag 450 are therefore maintained within the bag 450 and not allowed to seep through to the open end 403.

Figure 36:
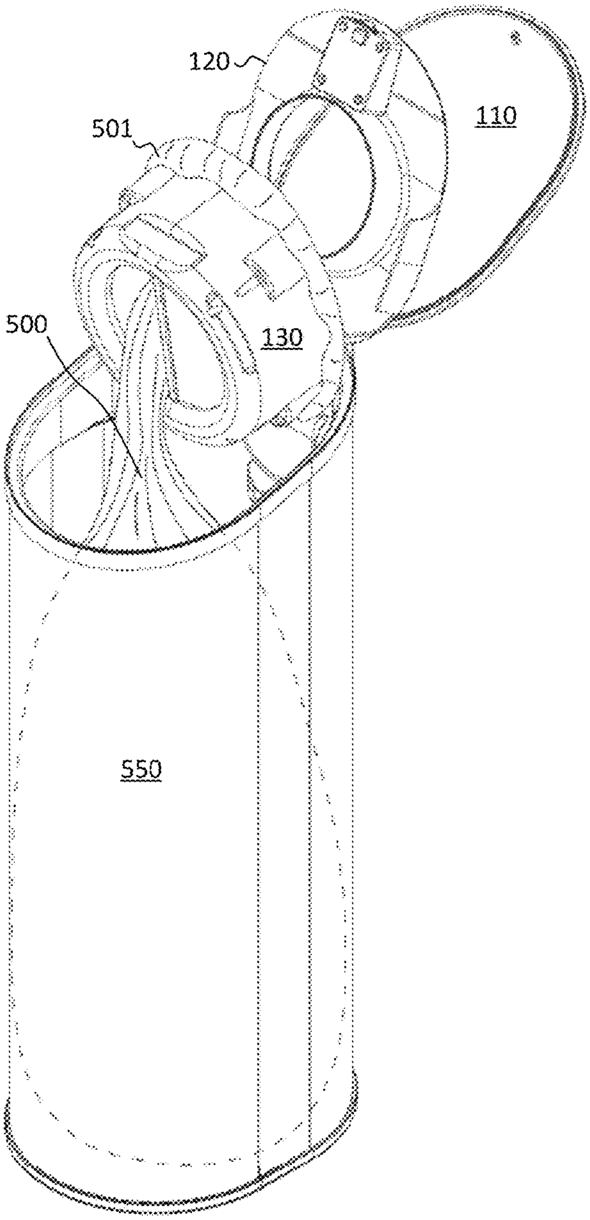
FIG. 36 is a cross-sectional view of an open lid assembly showing a standard bag placement within a container with extended bag holding soiled material, according to an exemplary embodiment of the present subject disclosure.

FIGS. 35 and 36 show a cross-sectional view and front perspective view, respectively, of a container 100 using a standard bag 500. Container 100 has a universal design which can accommodate a cassette 300 (FIG. 40), a single use bag assembly 400 (FIG. 41), and any standard bag 500. Features shown and presented in FIGS. 35, 36, 42, and 43 allow any standard bag to be fitted within container 100, preferably if the right size (e.g., 10 gallon, 13 gallon, etc.) to fit the container 100.

Figure 42:
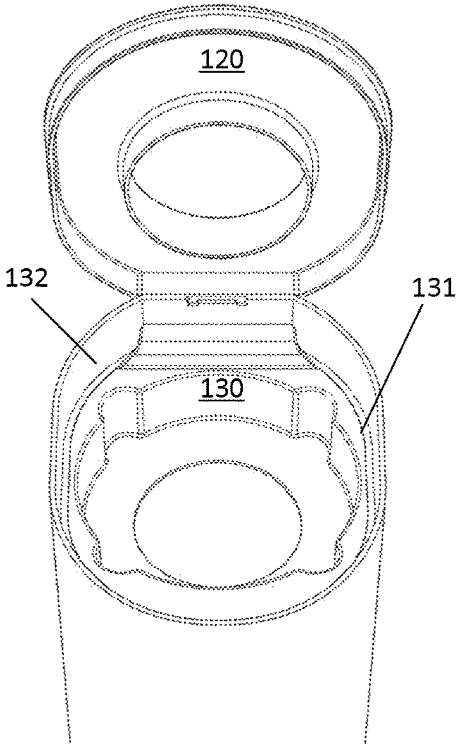
FIG. 42 is a perspective view of a container top portion with first lid and second lid lifted, and features to accept a standard bag inserted therein, according to an exemplary embodiment of the present subject disclosure.

As shown in FIGS. 35-36, standard bag 500 is inserted into container 100 by first pushing the bottom (closed) end of the bag 500 within the linear gap 135. Standard bag 500 has upper edge 501 which may then be pulled over the upper edge of a lifted third lid cartridge 130, as shown in FIGS. 35-36. The third lid cartridge 130 is then gently lowered into position with the upper edge 501 of the bag 500 tucked into the gap 131 formed between the third lid cartridge 130 and body rim 132 on the interior of the container 100, as shown in FIGS. 35 and 42. The body rim 132 prevents a gap 131 from being visible. The lid assembly 110 is lowered into the container 100. The container 100 with standard bag 500 is now ready for use. A user places a soiled diaper into the open top portion of the bag 503 and pushes down so that the soiled diaper is pushed through the opened linear gap 135, which then separates the overlapped contact area 137 formed between the two planar sheets 133, 134. Once the soiled material pushes through the overlapped contact area 137, it drops into the open bag 550. When the soiled diaper has cleared the overlapped contact area 137, the planar surfaces 133, 134 make close contact again in the contact area 137, and gap 135 closes up so that the portion of the bag between the open bag 503 and the bottom bag 550 is sandwiched together between the two overlapping surfaces 133, 134. The odor and harmful contents inside the bag 550 are therefore maintained within the bag 550 and not allowed to seep through to the open end 503.

Figure 37:
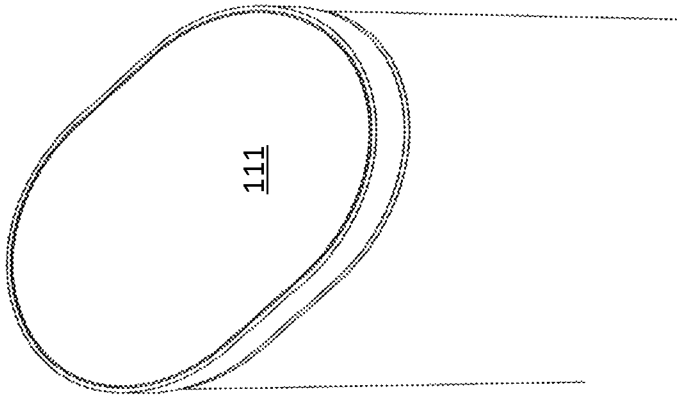
FIG. 37 is a perspective view of a container top portion, according to an exemplary embodiment of the present subject disclosure.
Figure 38:
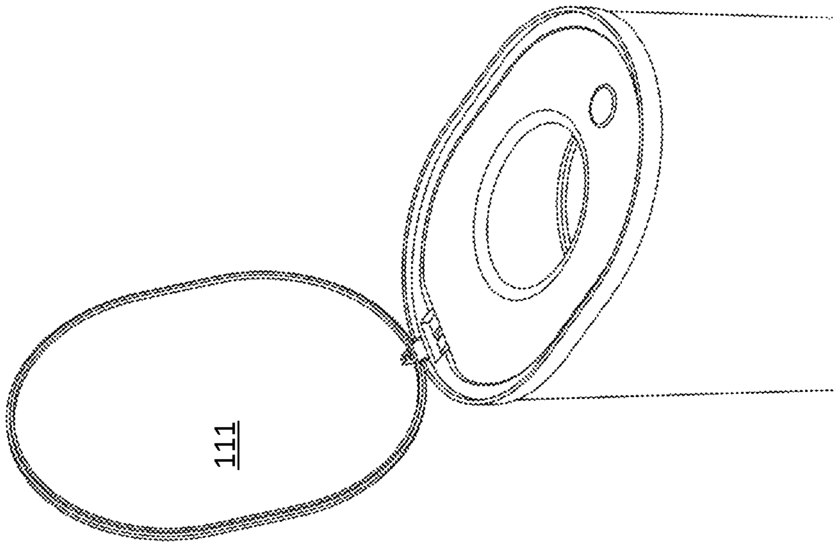
FIG. 38 is a perspective view of a container top portion with first lid open ready to receive a soiled diaper, according to an exemplary embodiment of the present subject disclosure.
Figure 39:
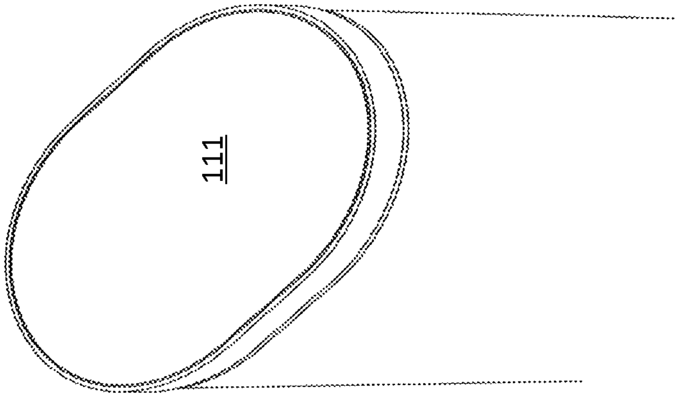
FIG. 39 is a perspective view of a container top portion with first lid closed after receipt of a soiled diaper, according to an exemplary embodiment of the present subject disclosure.

FIGS. 37, 38, and 39 show a simple three step procedure for discarding a soiled diaper. The first step, shown in FIG. 37, is to tap open the first lid 111. This will open the first lid 111 and allow access to the interior of the container 100. The second step, shown in FIG. 38, is to insert the soiled diaper within the top opening of the bag contained therein. Once the soiled diaper has been inserted, the third step is to simply close the first lid 111, as shown in FIG. 39.

Figure 43:
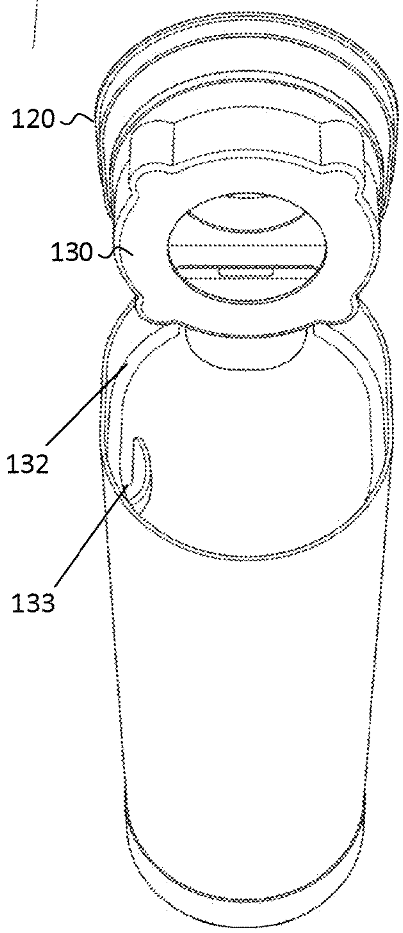
FIG. 43 is a perspective view of a container top portion with lid assembly lifted and features to accept a standard bag inserted therein, according to an exemplary embodiment of the present subject disclosure.

FIGS. 40-43 show various types of bags which may be used with container 100 according to the present subject disclosure. FIG. 40 shows use of a cassette 300. FIG. 41 shows use of a single use bag assembly 400. FIGS. 42-43 show how a standard bag 500 may be inserted on the third lid cassette 130. An internally placed cutter 133 assists in cutting the top end of a plastic sheet from the cassette 300.

The user may then knot the freshly cut top end of the open bag, and then discard it. The user then knots the bottom end of a new bag, which is formed by pulling down the sheet from cassette 300.

Figure 44:
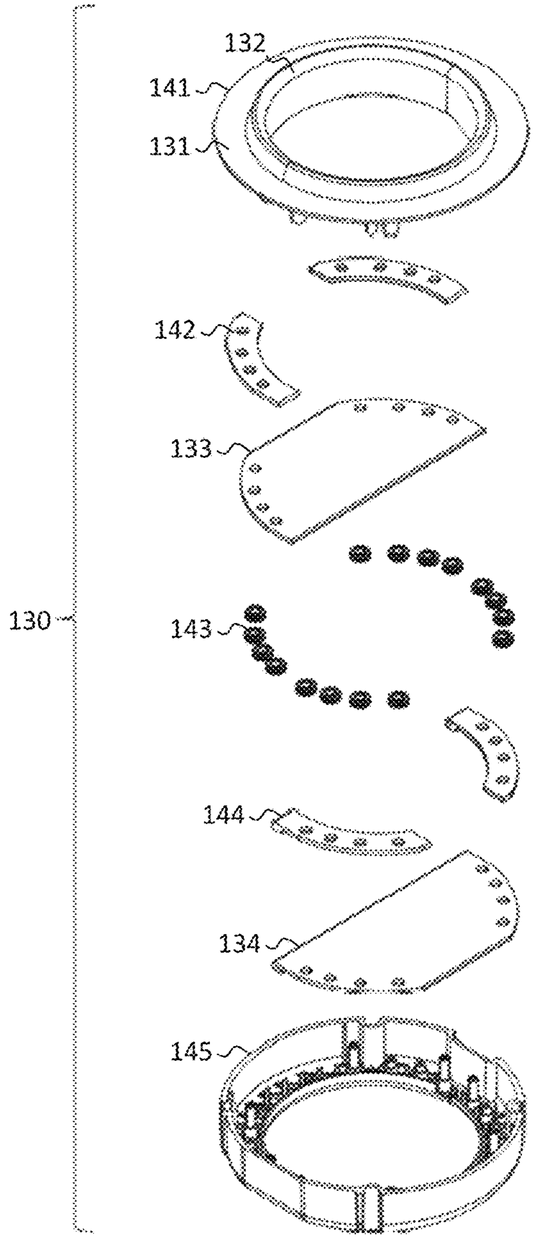
FIG. 44 is an exploded top perspective view of a third lid cartridge, according to an exemplary embodiment of the present subject disclosure.
Figure 45:
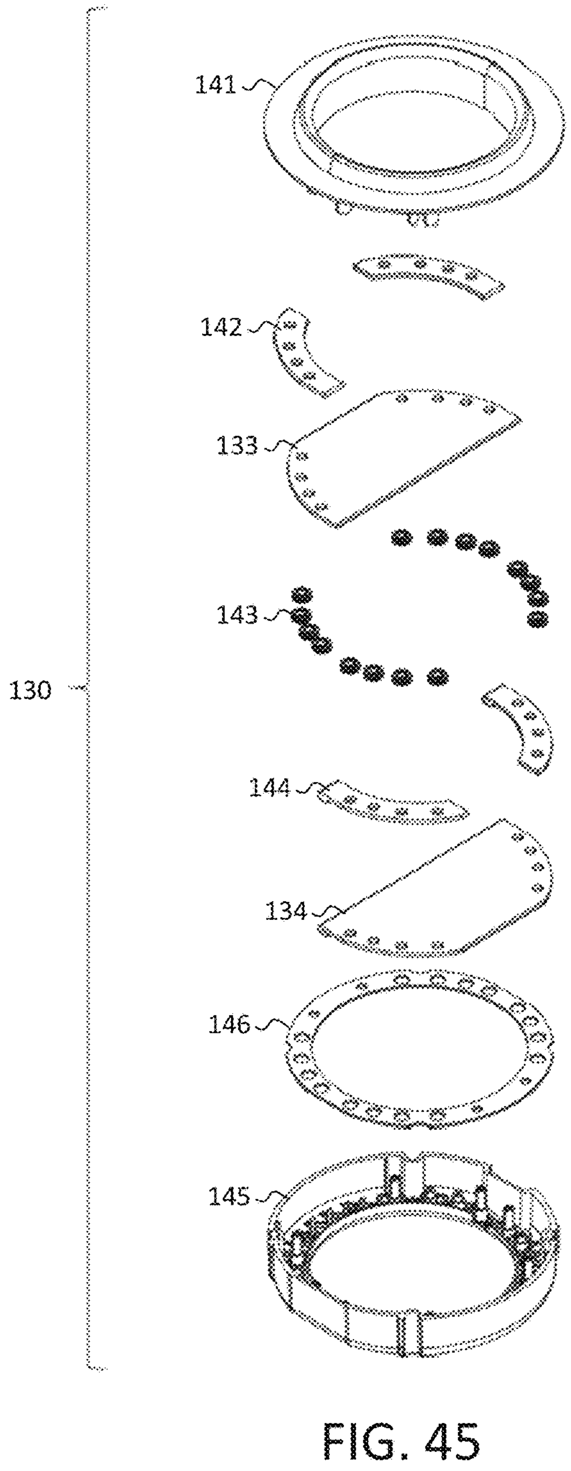
FIG. 45 is an exploded top perspective view of a third lid cartridge with optional ring plate, according to an exemplary embodiment of the present subject disclosure.

FIGS. 44 and 45 show top exploded views of the components of two different embodiments of the third lid cartridge 130. A top portion 141 includes both the outer rim 131 and vertical wall 132. A bottom portion 145 serves as the base to the third lid cartridge 130. The top portion 141 and bottom portion 145 sandwich the third lid cartridge 130 and keep all of the components held together through use of securing devices 143, such as bolts, screws, ties, or the like. A first planar sheet 133 and second planar sheet 134 are connected by top and bottom quarter arcs 142, 144, respectively, on the circular outer edge of the semi-circle planar sheets 133, 134. The quarter arcs 142, 144 serve to secure the outer edges of the planar sheets 133, 134 by locking them in place within the third lid cartridge 130. Each of these components may be taken out and replaced as needed. The embodiment shown in FIG. 45 has an optional additional locking ring 146 that is positioned directly above the bottom portion 145 and further secures the bottom edge of the planar sheets 133, 134.

Figure 46:
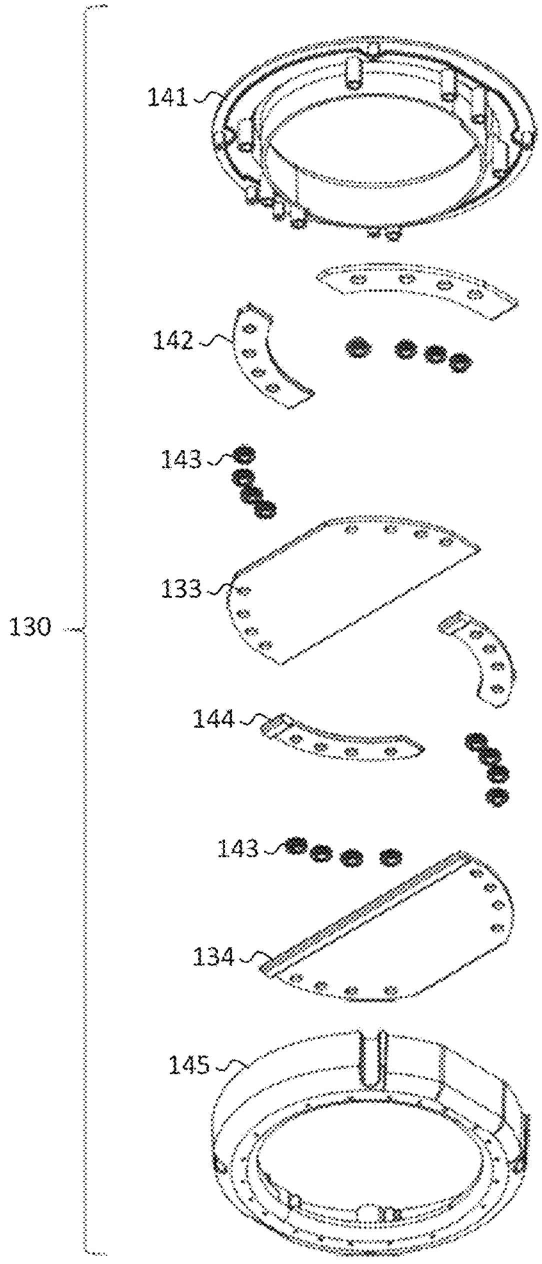
FIG. 46 is an exploded bottom perspective view of a third lid cartridge, according to an exemplary embodiment of the present subject disclosure.
Figure 47:
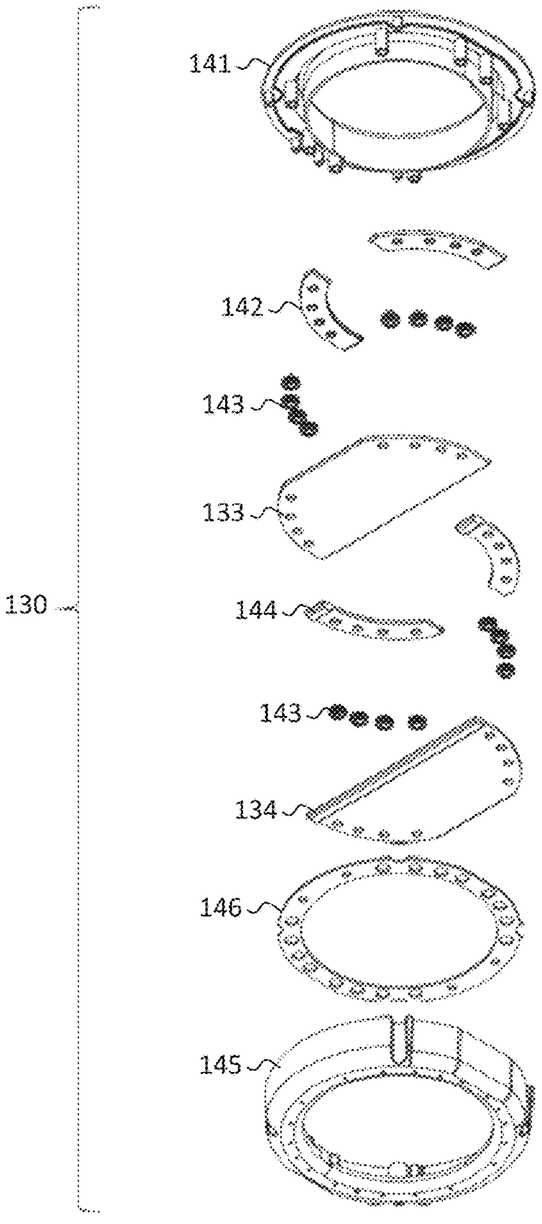
FIG. 47 is an exploded bottom perspective view of a third lid cartridge with optional ring plate, according to an exemplary embodiment of the present subject disclosure.

FIGS. 46 and 47 show bottom exploded views of the components of two different embodiments of the third lid cartridge 130. It should be noted that that the embodiments shown in FIGS. 44-47 show two sets of 8 attachment devices 143 on each side of the planar sheets 133, 134, but any number is possible.

Figure 48:
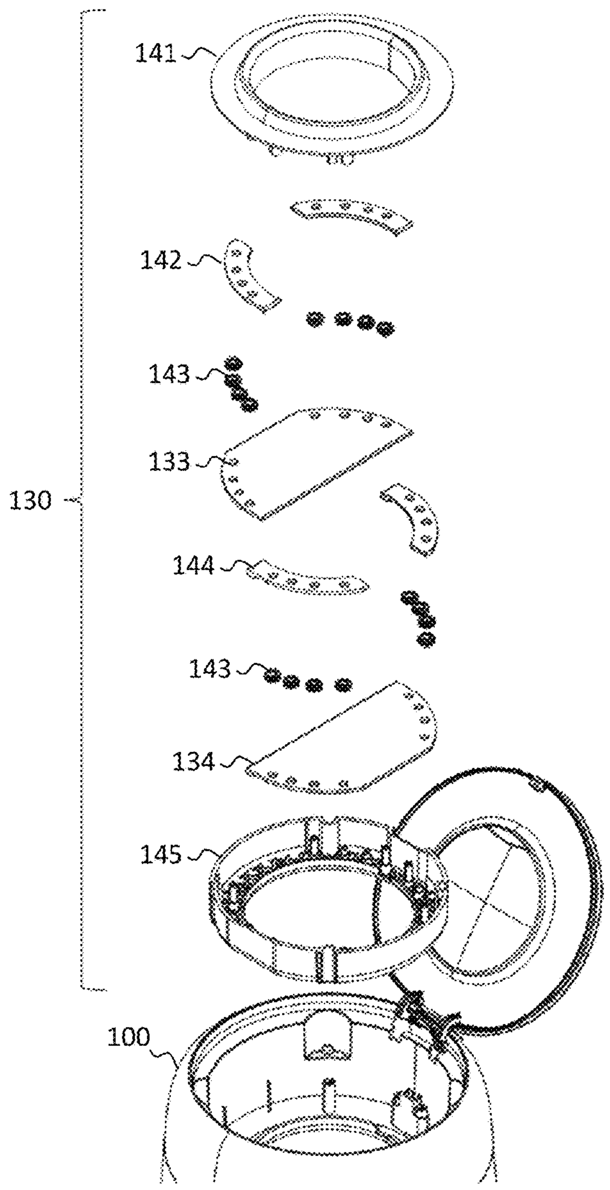
FIG. 48 is an exploded top perspective view of a third lid cartridge positioned atop a container, according to an exemplary embodiment of the present subject disclosure.
Figure 49:
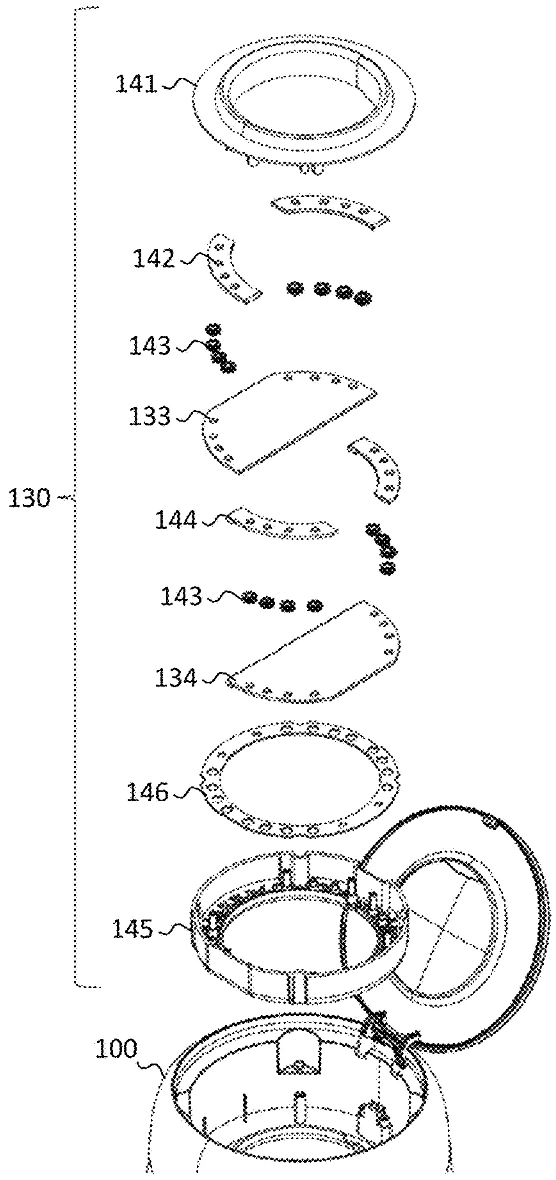
FIG. 49 is an exploded top perspective view of a third lid cartridge with optional ring plate positioned atop a container, according to an exemplary embodiment of the present subject disclosure.
Figure 50:
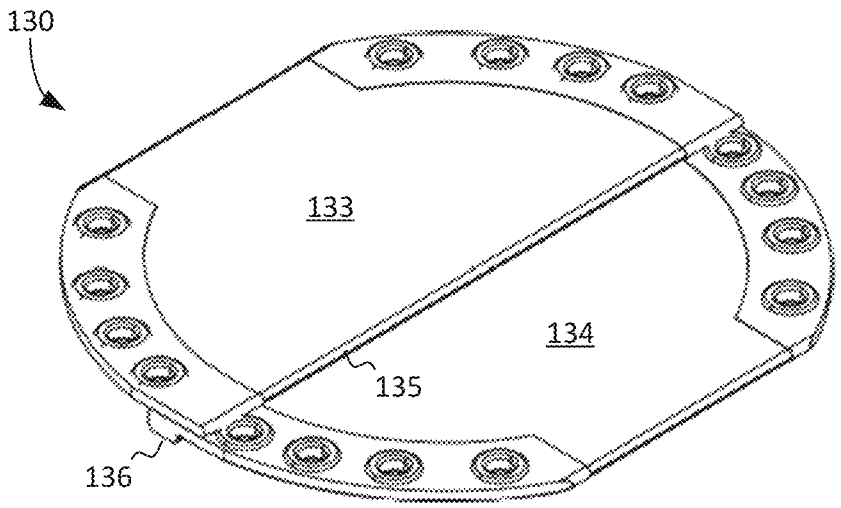
FIG. 50 is a top perspective view of two planar sheets, according to an exemplary embodiment of the present subject disclosure.
Figure 51:
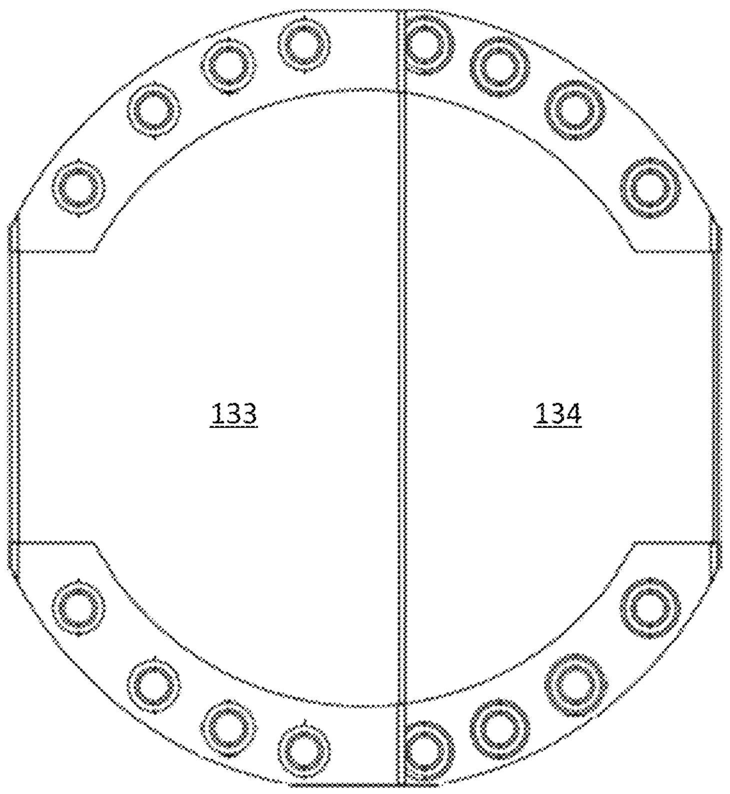
FIG. 51 is a top view of two planar sheets, according to an exemplary embodiment of the present subject disclosure.
Figure 52:
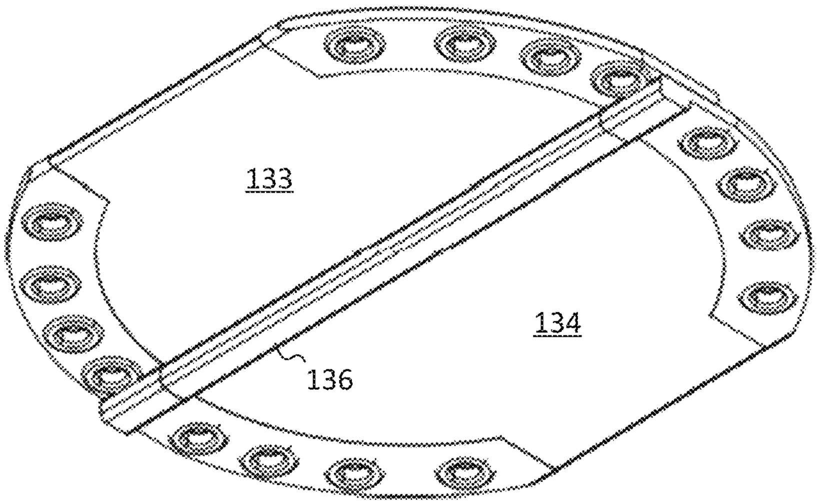
FIG. 52 is a bottom perspective view of two planar sheets, according to an exemplary embodiment of the present subject disclosure.
Figure 53:
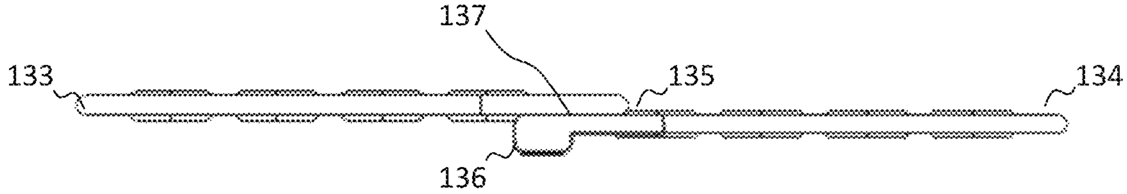
FIG. 53 is a side view of two planar sheets, according to an exemplary embodiment of the present subject disclosure.

FIGS. 48 and 49 show top exploded views of the components of two different embodiments of the third lid cartridge 130 positioned upon a top portion of a container 100, with first lid 111 and second lid 120 lifted upwards.

Various materials may be used for the third lid cartridge 130 and the components within. For example, planar sheets 133 and 134 may be elastic material with identifying colors, such as PANTONE 14-5707 TCX and PANTONE 16-5907 TCX, respectively. Any combination may be used as long as the characteristics of the combination of the planar sheets produce the function and result as shown and described herein.

The quarter arcs 142, 144 may be elastic, plastic, metal or other material. Each of the quarter arcs 142, 144 may be individually used or combined into a semi-circle or full circle. The planar sheets 143, 144 may be a durable and pliable material, such as NYLON or the like. The top portion 141 and bottom portion 145 may be glass filled PA66 or similar material. The optional ring 146 may be metallic, plastic, or other material.

As shown in the isolated views in FIGS. 50-53, and as shown positioned within the third lid cartridge 130 in the cross-sectional views of FIGS. 33-35, the planar sheets 133 and 134 are discontinuous such that the top surface of planar sheet 133 is positioned higher than the top surface of planar sheet 134. Additionally, as shown in the figures (see FIG. 53), the right most end of the planar sheet 133 ends at a position which is to the right of the left most end of the planar sheet 134. The end point of the planar sheet 133 creates a linear gap 135 which creates an area of overlap 137 between planar sheet 133 and planar sheet 134, and spans and acts as a chord across the circular section created by the vertical wall 132. See, for example FIG. 27. In this figure, the linear gap 135 is shown to be to the right of the vertical diameter which would run from the 6 to the 12 o'clock position on the circular planar sheet assembly 133, 134. This is so that the overlapped area 137 (shown in FIG. 53) would be maximized, therefore allowing a greater area to push soiled diaper therethrough.

Further, as shown in FIGS. 33-35 and elsewhere, planar sheet 134 folds over to create a U-shaped left most end 136, positioned underneath and to the left of the right end (at 135) of the planar sheet 133. This U-shaped end 136 allows bags to be positioned and secured within the linear gap 135. A downward push of the bag through the linear gap 135 creates a contact with the U-shaped curve 136 such that any upward motion in the bag would be resisted by the end of the U-shaped curve 136, which would contact the surface of the bag. This would allow for unidirectional (downward) movement of the bag through the gap 135.

The illustrations and examples provided herein are for explanatory purposes and are not intended to limit the scope of the appended claims. It will be recognized by those skilled in the art that changes, or modifications may be made to the above-described embodiments without departing from the broad inventive concepts of the invention. It is understood therefore that the invention is not limited to the particular embodiments which are described but is intended to cover all modifications and changes within the scope and spirit of the subject disclosure.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed:

1. A diaper pail, comprising:

a housing; and a lid assembly attached to the housing, the lid assembly having:

a first lid that allows access to an interior of a flexible bag assembly housed within the housing;

a second lid that allows access to a top structure of the flexible bag assembly housed within the housing;

a third lid cartridge that accommodates the flexible bag assembly, wherein an outer edge of the third lid cartridge creates a gap with an inner surface of the housing to allow a top portion of a bag created by the flexible bag assembly therethrough; and a pair of planar sheets that overlap with each other and pinch a portion of the bag formed by the flexible bag assembly, wherein the pair of planar sheets are composed of elastic material.

2. The diaper pail of claim 1, wherein the flexible bag assembly comprises a single use flexible bag having an attachment frame.

3. The diaper pail of claim 2, wherein the attachment frame is secured to the third lid cartridge.

4. The diaper pail of claim 1, wherein the flexible bag assembly comprises a cassette adapted to dispense a flexible tubing.

5. The diaper pail of claim 4, wherein the cassette is secured to the third lid cartridge.

6. The diaper pail of claim 1, wherein the flexible bag assembly comprises a single bag.

7. The diaper pail of claim 6, wherein the single bag is secured to the third lid cartridge by pulling an upper open end of the single bag over into the gap.

8. The diaper pail of claim 1, wherein the second lid and the third lid cartridge both have a central opening.

9. The diaper pail of claim 1, wherein the first lid rotates about a first hinge attached to an upper end of the housing.

10. The diaper pail of claim 1, wherein the second lid and third lid cartridge rotate about a second hinge attached to an interior of the housing.

11. The diaper pail of claim 1, wherein the pair of planar sheets are positioned in the third lid cartridge.

12. The diaper pail of claim 1, further comprising a linear gap which is formed by the overlap of one of the planar sheets over the other planar sheet.

13. The diaper pail of claim 12, further wherein the linear gap is a chord which extends from one point on a circular frame to another point on the circular frame, the chord not being a diameter of the circular frame.

14. The diaper pail of claim 1, wherein one of the planar sheets is positioned lower than the other planar sheet.

15. The diaper pail of claim 14, wherein the lower planar sheet has a U-shaped end that curves to an underside of a lower surface of the planar sheet.

16. The diaper pail of claim 15, wherein the U-shaped end of the lower planar sheet is positioned underneath an overlap area between the first planar sheet and the second planar sheet.

17. A diaper pail, comprising:

a housing; and a lid assembly attached to the housing, the lid assembly having:

a first lid that allows access to an interior of a flexible bag assembly having a bag and housed within the housing;

a second lid that allows access to a top structure of the flexible bag assembly housed within the housing;

a third lid cartridge that is pivotally attached to the second lid and accommodates the flexible bag assembly, wherein an outer edge of the third lid cartridge creates a gap with an inner surface of the housing to allow a top portion of the bag therethrough; and a pair of planar sheets composed of elastic material and that overlap with each other and pinch a portion of the bag formed by the flexible bag assembly.

18. A diaper pail, comprising:

a housing having an upper end and a lower end; and a lid assembly attached to the upper end of the housing, the lid assembly having:

a first lid pivotally attached to the upper end of the housing and allows access to an interior of a flexible bag assembly having a bag and housed within the housing;

a second lid that allows access to a top structure of the flexible bag assembly housed within the housing;

a third lid cartridge pivotally attached to the second lid and that accommodates the flexible bag assembly, wherein an outer edge of the third lid cartridge creates a gap with an inner surface of the housing to allow a top portion of the bag created by the flexible bag assembly therethrough; and a pair of planar sheets composed of elastic material and positioned within the third lid cartridge that overlap with each other and pinch a portion of the bag formed by the flexible bag assembly.

* * * * *